(12) United States Patent
Oshiba

(10) Patent No.: US 10,845,936 B2
(45) Date of Patent: Nov. 24, 2020

(54) MESSAGE DISPLAY TERMINAL, MESSAGE TRANSMISSION SERVER, AND INFORMATION STORAGE MEDIUM

(71) Applicant: KONAMI DIGITAL ENTERTAINMENT CO., LTD., Tokyo (JP)

(72) Inventor: Shingo Oshiba, Minato-ku (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 262 days.

(21) Appl. No.: 15/239,833

(22) Filed: Aug. 18, 2016

(65) Prior Publication Data

US 2016/0357360 A1 Dec. 8, 2016

Related U.S. Application Data

(63) Continuation of application No. PCT/JP2015/054459, filed on Feb. 18, 2015.

(30) Foreign Application Priority Data

Feb. 21, 2014 (JP) .................................. 2014-032030

(51) Int. Cl.
*G06F 3/048* (2013.01)
*G06F 3/0481* (2013.01)
(Continued)

(52) U.S. Cl.
CPC ........ *G06F 3/0481* (2013.01); *G06F 3/04842* (2013.01); *G06F 13/00* (2013.01);
(Continued)

(58) Field of Classification Search
CPC ............... G06F 3/0486; G06F 3/04886; G06F 3/04817; G06F 3/0236; G06F 3/0481;
(Continued)

(56) References Cited

U.S. PATENT DOCUMENTS 9,380,011 B2 * 6/2016 Rasmussen ............. H04L 51/04
2007/0008973 A1 * 1/2007 Galea .................... G06F 9/4416
370/392

(Continued)

FOREIGN PATENT DOCUMENTS

CN 102362252 A 2/2012
JP H11-024990 A 1/1999
(Continued)

OTHER PUBLICATIONS

Office Action dated Aug. 31, 2018, for corresponding CN Patent Application No. 201580008800.0 and English translation thereof.

*Primary Examiner* — Haoshian Shih
(74) *Attorney, Agent, or Firm* — HEA Law PLLC

(57) ABSTRACT

A message display terminal comprising at least one processor configured to: display a message object representing a message input by each of a plurality of users in a display mode that enables a user having input the message to be identified; receive a selection operation for selecting the message object; obtain message data, which is generated in response to the selection operation, relating to a second message which is determined based on a first message represented by a first message object which is the selected message object; and display a second message object representing the second message in a display mode that enables a user having conducted the selection operation to be identified as a user having input the second message based on the obtained message data.

14 Claims, 16 Drawing Sheets

(51) Int. Cl.
  *G06F 13/00*  (2006.01)
  *H04M 1/725*  (2006.01)
  *G06F 3/0484*  (2013.01)
  *H04L 12/58*  (2006.01)

(52) U.S. Cl.
  CPC ...... *H04L 51/046* (2013.01); *H04M 1/72552* (2013.01); *H04M 1/72583* (2013.01); *H04M 2250/22* (2013.01)

(58) Field of Classification Search
  CPC ...... G06F 3/04842; G06F 13/00; H04W 4/12; G06Q 10/10; H04L 51/046; H04M 1/72552; H04M 1/72583; H04M 2250/22
  See application file for complete search history.

(56) References Cited

U.S. PATENT DOCUMENTS

| | | | |
|---|---|---|---|
| 2008/0168373 A1* | 7/2008 | Wilson | G06F 3/0486 715/769 |
| 2010/0245261 A1 | 9/2010 | Karlsson | |
| 2012/0306774 A1* | 12/2012 | Lee | G06F 3/0486 345/173 |
| 2013/0091443 A1* | 4/2013 | Park | G06F 3/0485 715/758 |

FOREIGN PATENT DOCUMENTS

| | | |
|---|---|---|
| JP | 4637192 B2 | 2/2011 |
| JP | 2011-212296 A | 10/2011 |
| JP | 2012-522284 A | 9/2012 |

\* cited by examiner

FIG.5

| MESSAGE ID | INPUTTER INFORMATION | MESSAGE | TIME INFORMATION |
|---|---|---|---|
| 001 | USER A | HANG IN THERE! | 17:35:40 |
| 002 | USER B | GO GET 'EM! | 17:35:42 |
| 003 | USER D | ALMOST THERE! | 17:35:45 |
| ⋮ | ⋮ | ⋮ | ⋮ |

FIG.15
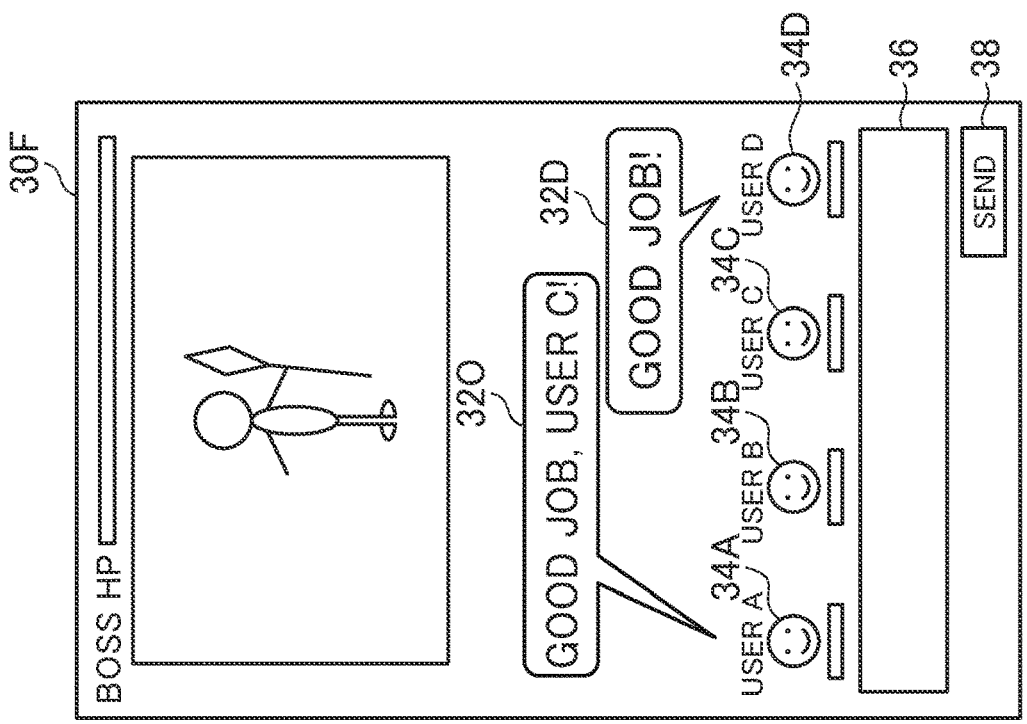
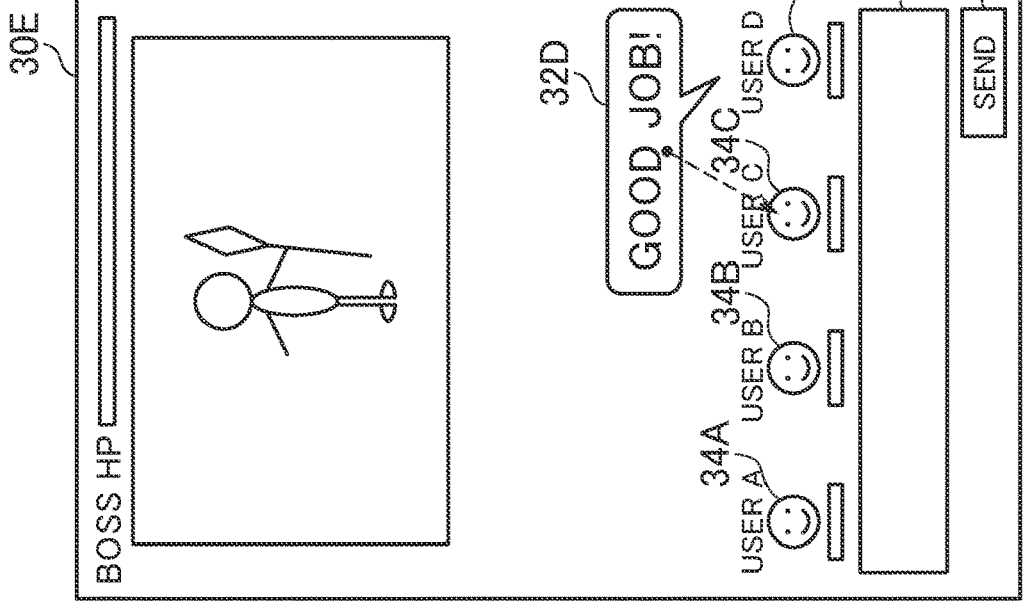

FIG.16
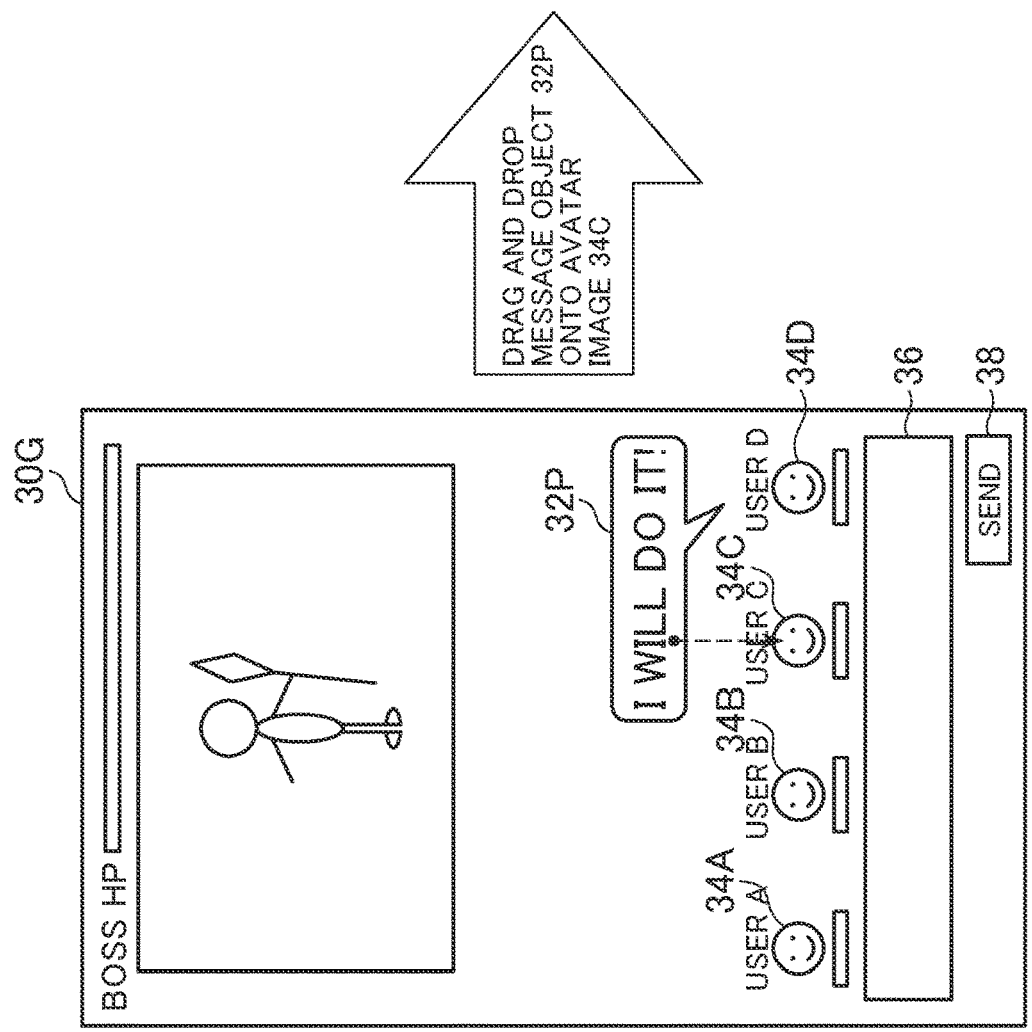
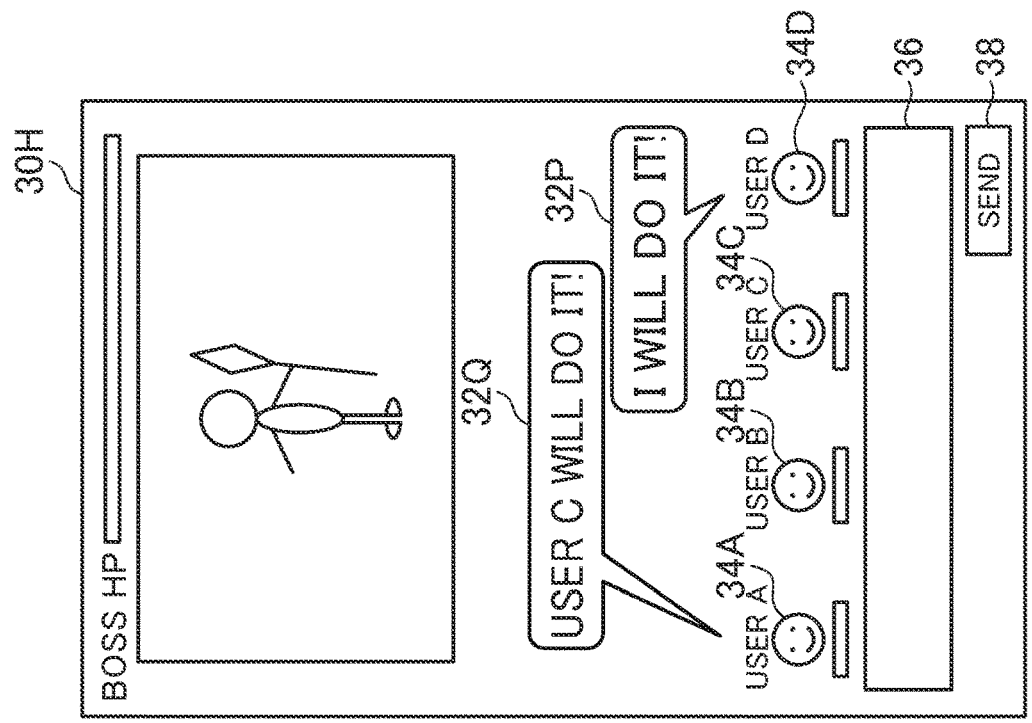

MESSAGE DISPLAY TERMINAL, MESSAGE TRANSMISSION SERVER, AND INFORMATION STORAGE MEDIUM

CROSS-REFERENCE TO RELATED APPLICATION

The present disclosure contains subject matter related to that disclosed in Japanese Patent Application JP2014-032030 filed in the Japan Patent Office on Feb. 21, 2014 and International Patent Application PCT/JP2015/054459 filed in the Japan Patent Office on Feb. 18, 2015, the entire contents of which are hereby incorporated by reference.

BACKGROUND OF THE INVENTION

1. Field of the Invention

The present invention relates to a message display terminal, a message transmission server, and an information storage medium therefor.

2. Description of the Related Art

Hitherto, there is known a technology for allowing each of a plurality of users to input a message to realize communication among the users. For example, in JP 4637192 B2, there is described a device configured to allow, in a chat joined by a plurality of users, each of the users to input his or her own message into a predetermined input form.

SUMMARY OF THE INVENTION

However, in the technology of JP 4637192 B2, each user needs to bother to complete an input form with a message. This requires time and labor to input a message.

The present invention has been made in view of the above-mentioned problem, and has an object to provide a message display terminal, a message transmission server, and an information storage medium therefor, which are capable of alleviating time and labor to input a message.

In order to solve the above-mentioned problem, a message display terminal according to one embodiment of the present invention relates to a message display terminal comprising at least one processor configured to: display a message object representing a message input by each of a plurality of users in a display mode that enables a user having input the message to be identified; receive a selection operation for selecting the message object; obtain message data, which is generated in response to the selection operation, relating to a second message which is determined based on a first message represented by a first message object which is the selected message object; and display a second message object representing the second message in a display mode that enables a user having conducted the selection operation to be identified as a user having input the second message based on the obtained message data.

Further, a message display terminal according to one embodiment of the present invention relates to a message display terminal comprising at least one processor configured to: display a message object representing a message input by each of a plurality of users; receive a selection operation for selecting the message object; obtain message data, which is generated in response to the selection operation, relating to a second message which is determined based on a first message represented by a first message object which is the selected message object; and display a second message object representing the second message based on the obtained message data.

Further, a message transmission server according to one embodiment of the present invention relates to a message transmission server comprising at least one processor configured to: transmit message data relating to a message input by each of a plurality of users to a terminal of each user; receive, from the terminal of the each user, a message selection notification indicating that a message object representing the message has been selected; generate message data, in response to the received message selection notification, relating to a second message which is determined based on a first message represented by a first message object which is the selected message object; set a user of a transmission source of the message selection notification as a user having input the second message; and transmit the generated message data to the terminal of the each user.

BRIEF DESCRIPTION OF THE DRAWINGS

FIG. 5 is a table for showing a data storage example of a message database.

FIG. 15 is a diagram for illustrating an example of the chat image.

FIG. 16 is a diagram for illustrating an example of the chat image.

DETAILED DESCRIPTION OF THE INVENTION

1. First Embodiment

Now, exemplary embodiments of the present invention are described in detail with reference to the drawings. This embodiment is described by taking an example in which a message transmission server and a message display terminal according to the present invention are applied to a message control system for controlling a chat joined by a plurality of user.

[1-1. Overall Configuration of Message Control System]

Figure 1:
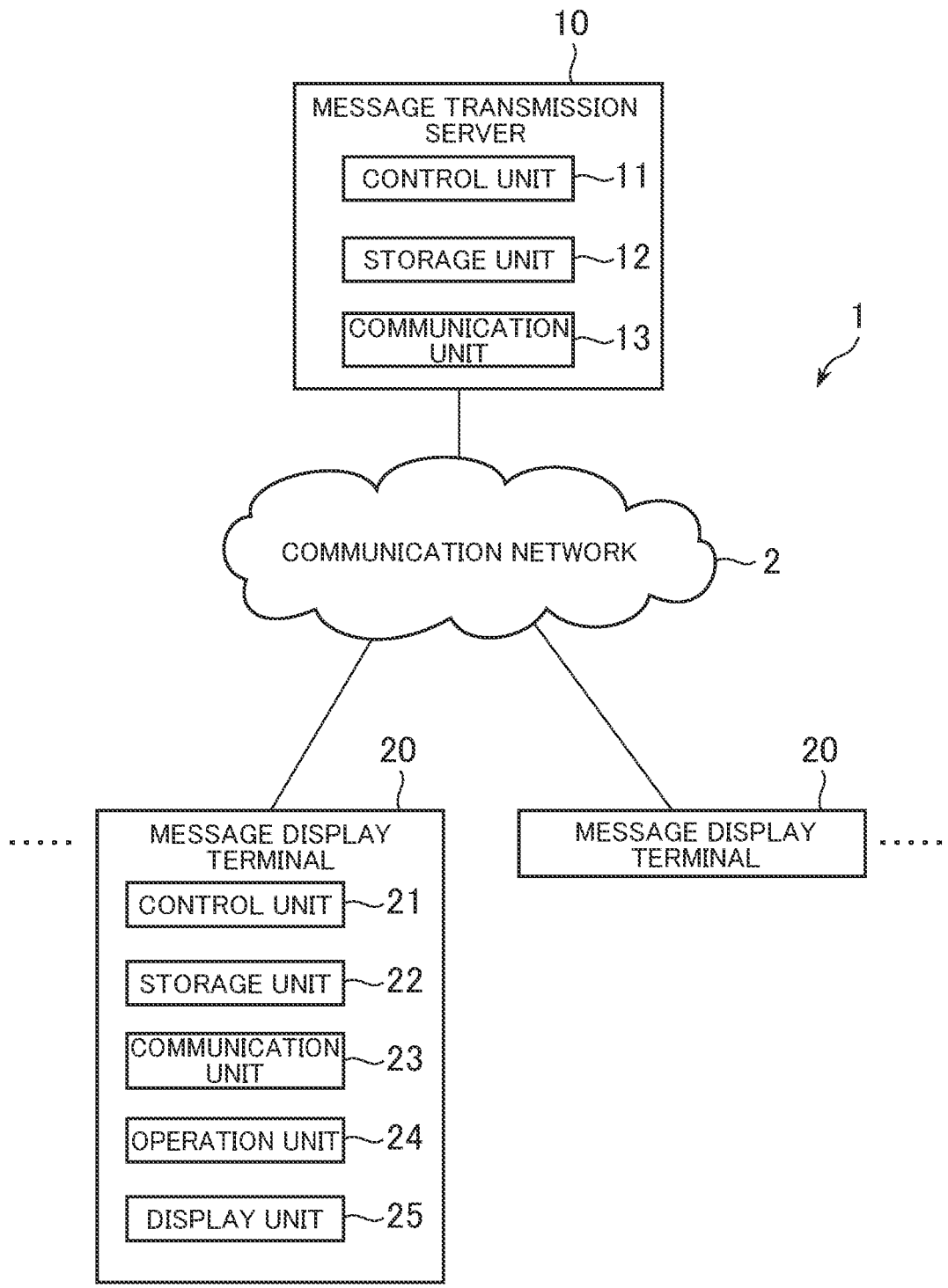
FIG. 1 is a diagram for illustrating an overall configuration of a message control system according to an embodiment of the present invention.

FIG. 1 is a diagram for illustrating an overall configuration of a message control system according to the embodiment. As illustrated in FIG. 1, a message control system 1 includes a message transmission server 10 and a plurality of message display terminals 20. The message transmission server 10 and the respective message display terminals 20 are connected to one another through a communication network 2 so as to enable data transmission and reception there among.

The message transmission server 10 is achieved by a server computer. As illustrated in FIG. 1, the message transmission server 10 includes a control unit 11, a storage unit 12, and a communication unit 13. For example, the control unit 11 includes a microprocessor and others, and is configured to execute processing in accordance with an operating system or other programs. The storage unit 12 includes a main memory unit (for example, RAM) and an auxiliary storage unit (for example, hard disk drive or solid state drive). The communication unit 13 is configured to communicate data via the communication network 2.

The message display terminal 20 is a computer operated by the user. For example, the message display terminal 20 is achieved by a mobile phone (including a smartphone), a mobile information terminal (including a tablet computer), a game machine, or a personal computer. As illustrated in FIG. 1, the message display terminal 20 includes a control unit 21, a storage unit 22, a communication unit 23, an operation unit 24, and a display unit 25.

The control unit 21, the storage unit 22, and the communication unit 23 are the same as the control unit 11, the storage unit 12, and the communication unit 13 of the message transmission server 10. The operation unit 24 is an input device, and is, for example, a touch panel. The display unit 25 is, for example, a liquid crystal display panel or an organic EL display, and is configured to display various images based on an instruction issued by the control unit 21.

In this embodiment, programs and data described as being stored in the storage unit 12 and the storage unit 22 may be supplied to, for example, the message transmission server 10 and the message display terminal 20 through the communication network 2. Further, the message transmission server 10 or the message display terminal 20 may include a component configured to read a program or data stored on a computer readable information storage medium (for example, memory card). Then, the program or data may be supplied to the message transmission server 10 or the message display terminal 20 through the information storage medium.

[1-2. Chat Executed by Message Control System]

Next, a chat executed by the message control system 1 is described by taking, as an example, a scene in which four users playing a game have a chat while cooperating with one another in order to beat a common enemy. In this case, those four users are referred to respectively as "users A, B, C, and D". Further, in this case, the user represents a person who inputs a message (person who operates the message display terminal 20).

Figure 2:
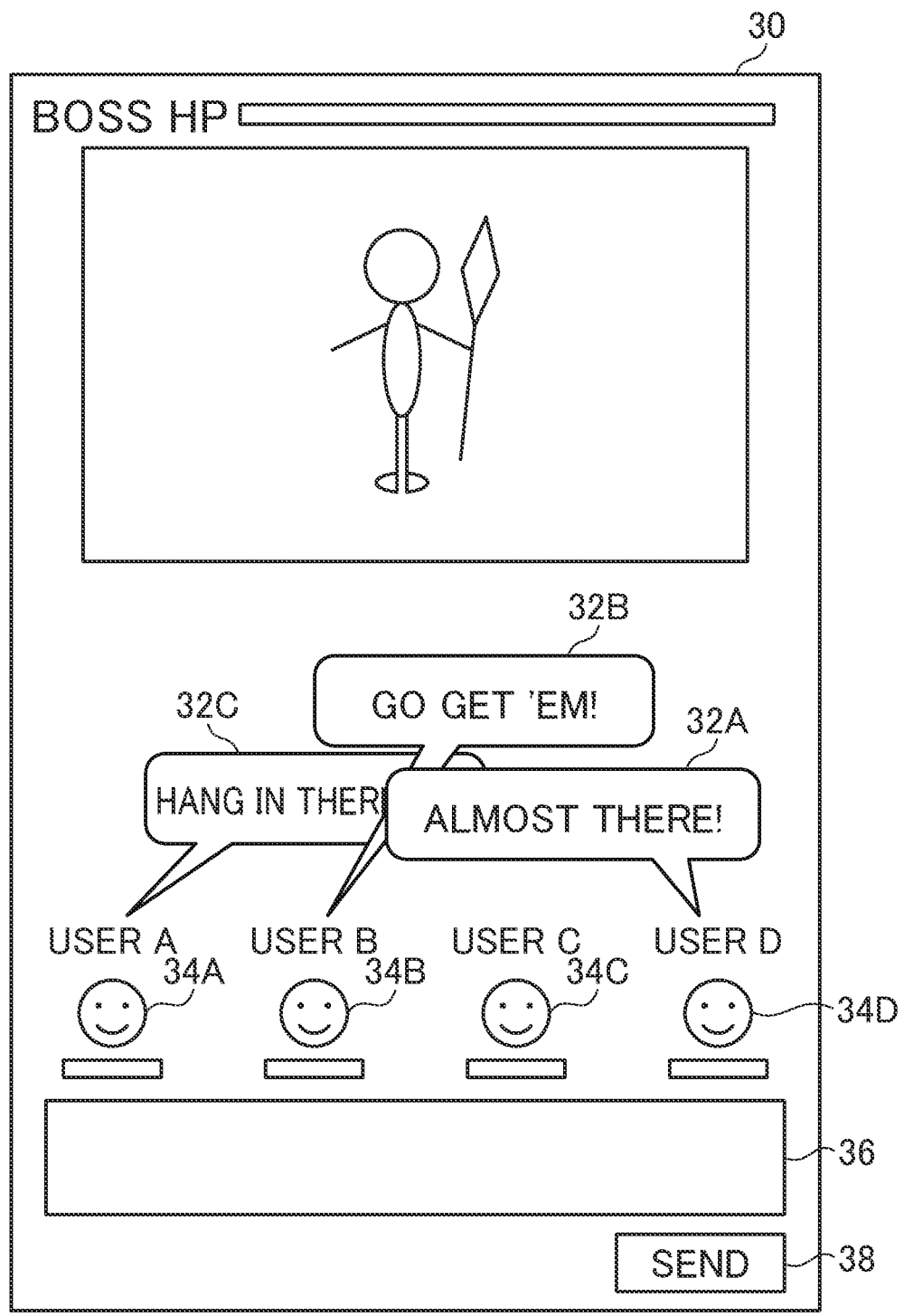
FIG. 2 is a diagram for illustrating an example of a chat image displayed on a message display terminal of a user.

FIG. 2 is a diagram for illustrating an example of a chat image displayed on the message display terminal 20 of the user A. As illustrated in FIG. 2, message objects 32A to 32C (hereinafter also referred to collectively as "message object 32") representing respective messages of the plurality of users and avatar images 34A to 34D (hereinafter also referred to collectively as "avatar image 34") representing the respective users having joined the chat are displayed in the chat image 30.

The message represents a content of information transmitted between the terminals operated by the user, and is, for example, a symbol string, an image, a moving image, or a voice that is input or specified by the user or a combination thereof. In this case, the symbol string means not only a character string (text) but also symbols other than a language (for example, an emoticon, an ASCII art, or symbols, e.g., a plus sign and a minus sign, which form a code recognizable to only the users). The message object can also be said to be an image representing a message. That is, when being merely described as "message", the message indicates the content itself of the text or the like, and when being described as "message object", the message object indicates a display target on the display unit 25, and the message and the message object are distinguished from each other. The message object 32 may also be expressed three-dimensionally within a virtual space instead of being expressed two-dimensionally as illustrated in FIG. 2.

The message object 32A represents a message input by the user D. Therefore, the message object 32A is displayed so that a balloon is drawn from the avatar image 34D of the user D. In the same manner, the message objects 32B and 32C represent messages input by the users B and A, respectively. Therefore, the message object 32B is displayed so that a balloon is drawn from the avatar image 34B of the user B, and the message object 32C is displayed so that a balloon is drawn from the avatar image 34A of the user A. In this manner, the message objects 32 are each displayed in a display mode that enables the user having input the message (in this embodiment, referred to simply as "inputter") to be identified. In this case, the inputter does not represent a person himself or herself, but represents information for identifying the user having input the message (for example, user's name or account) or information for identifying the message display terminal 20.

Further, in the chat image 30, as the message becomes newer, the message object 32 is displayed in an upper layer. Therefore, in a screen example illustrated in FIG. 2, the message represented by the message object 32A displayed in the uppermost layer is the newest, and the message represented by the message object 32C displayed in the lowermost layer is the oldest. In addition, the message objects 32 are each configured to be erased from the chat image 30 after a fixed time period has elapsed. That is, the respective message objects 32 displayed with overlaps are erased from the one displayed in the lowermost layer.

The user A can transmit a new message by inputting a message into an input form 36 and selecting a send button 38. That is, when the user A selects the send button 38, a new message object 32 representing the message input into the input form 36 is displayed so as to be drawn from the avatar image 34A of the user A. In addition, in this embodiment, without the need to input a message into the input form 36, the user A selects the message object 32 that has already been displayed, to thereby be able to divert the message represented by the message object 32 to use the message as a new message.

Figure 3:
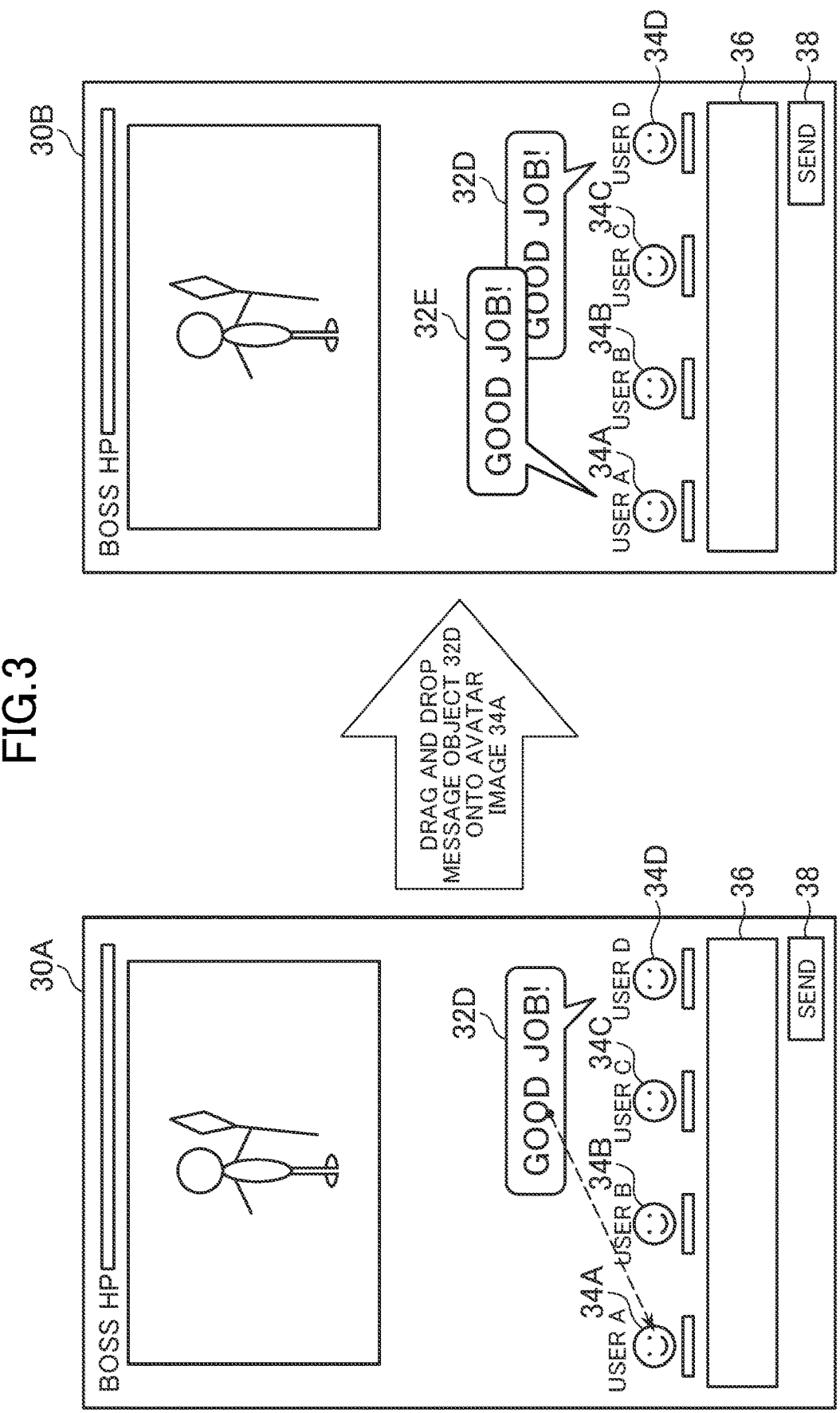
FIG. 3 is a screen transition diagram for illustrating a case where the user diverts a message.

FIG. 3 is a screen transition diagram for illustrating a case where the user A diverts a message. As illustrated in FIG. 3, through drag-and-drop of a message object 32D representing a message of the user D onto his or her own avatar image 34A (in the state of a chat image 30A of FIG. 3), the user A can divert the message represented by the message object 32D to utter the message as a message input by himself or herself. Therefore, as illustrated in a chat image 30B, a message object 32E representing the same message as the message represented by the message object 32D is displayed as the utterance of the user A.

The description is made with reference to FIG. 2 and FIG. 3 by taking, as an example, the chat image 30 displayed on the message display terminal 20 of the user A, but in the same manner, the message object 32D representing the message, which has been diverted by the user A, is displayed in the chat images 30 of the users B, C, and D. In addition, in the same manner, through drag-and-drop of the message object 32 displayed on the his or her own message display terminal 20 onto his or her own avatar image 34, the users B, C, and D can each divert the message represented by the message object 32 to use the message as his or her own utterance. Processing for achieving this technology is described below in detail.

[1-3. Functions Achieved by Message Control System]

Figure 4:
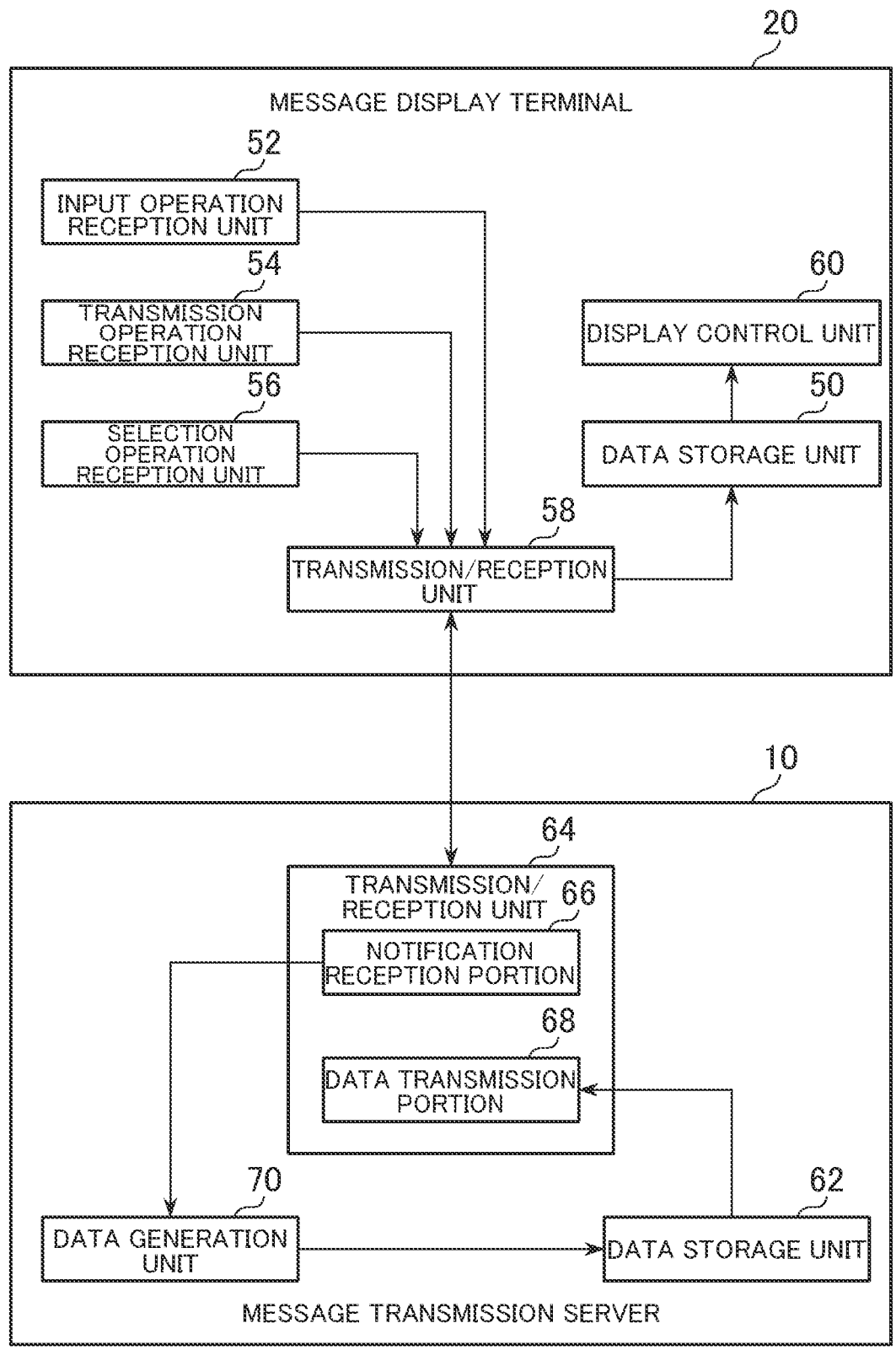
FIG. 4 is a functional block diagram for illustrating functions relating to the present invention among functions achieved by the message control system.

FIG. 4 is a functional block diagram for illustrating functions relating to the present invention among functions achieved by the message control system 1. In this case, functions achieved by each message display terminal 20 are described, and then functions achieved by the message transmission server 10 is described. In FIG. 4, only one message display terminal 20 is illustrated for the sake of brevity, but the same functions are achieved by the respective message display terminals 20.

[1-3-1. Functions Achieved by Each Message Display Terminal]

On each message display terminal 20, a data storage unit 50, an input operation reception unit 52, a transmission operation reception unit 54, a selection operation reception unit 56, a transmission/reception unit 58, and a display control unit 60 are achieved. The input operation reception unit 52, the transmission operation reception unit 54, and the selection operation reception unit 56 are achieved mainly by the control unit 21 and the operation unit 24, the transmission/reception unit 58 is achieved mainly by the control unit 21 and the communication unit 23, and the display control unit 60 is achieved mainly by the control unit 21 and the display unit 25.

[Data Storage Unit]

The data storage unit 50 is configured to store data required for displaying the chat image 30. For example, the data storage unit 50 stores message data relating to a message received from a transmission/reception unit 64 of the message transmission server 10 by the transmission/reception unit 58 described later. The message object 32 that has been displayed for the fixed time period is erased from the display unit 25, and hence the data used for displaying the message object 32 may be erased from the data storage unit 50 after the fixed time period has elapsed.

[Input Operation Reception Unit]

The input operation reception unit 52 is configured to receive the input of a message. For example, the input operation reception unit 52 receives the input of a symbol string or the specification of an image, which is conducted by the user. The image included in the message may be stored on the message display terminal 20, or may be stored on the message transmission server 10.

[Transmission Operation Reception Unit]

The transmission operation reception unit 54 is configured to receive a transmission operation for transmitting the input message. It suffices that the transmission operation is an operation defined in advance, and in this embodiment, the transmission operation reception unit 54 receives the selection of the send button 38 for transmitting the message input into the input form 36.

[Selection Operation Reception Unit]

The selection operation reception unit 56 is configured to receive a selection operation for selecting the message object 32. The selection operation is an operation different from the transmission operation. The selection operation can also be said to be an operation for specifying at least one of the message objects 32 displayed on the display unit 25. In the selection operation, the message object 32 representing the message input by a user conducting the selection operation (that is, message input by himself or herself) may be selected, or the message object 32 representing the message input by a user different from the user conducting the selection operation (that is, message input by another user) may be selected.

The selection operation may be divided into two operations of a first selection operation and a second selection operation. In this case, for example, the "first selection operation" corresponds to a drag of the message object 32, and the "second selection operation" corresponds to a drop of the message object 32 into a predetermined position (position of his or her own avatar image 34 or the like). Further, the selection operation is not limited thereto, and may be the selection of the message object 32 through a tap, a double tap, a tap and hold, a pinch out, or a pinch in.

[Transmission/Reception Unit]

The transmission/reception unit 58 is configured to transmit and receive various kinds of data to and from the transmission/reception unit 64 of the message transmission server 10. In this embodiment, the transmission/reception unit 58 receives the message data generated by a data generation unit 70 of the message transmission server 10. The message data received by the transmission/reception unit 58 is recorded on the data storage unit 50.

Further, for example, the transmission/reception unit 58 transmits, to the message transmission server 10, a message input notification indicating that a message has been input. The message input notification represents a notification indicating that a message has been input at a transmission source thereof, and is issued through the transmission of data having a format defined in advance. In this case, the transmission source represents the message display terminal 20 that has received the input of the message and the transmission operation (message display terminal 20 of the user having conducted the transmission operation).

The message input notification includes the message input into the input form 36 and information for identifying the inputter (for example, information for identifying the user or information for identifying the message display terminal 20). When the send button 38 is selected with the message having been input into the input form 36 on the message display terminal 20 of each user, the message input notification is transmitted from the message display terminal 20. In other words, the message input notification is transmitted when the user conducts the transmission operation.

Further, the transmission/reception unit 58 transmits a message selection notification indicating that the selection operation reception unit 56 has received a selection operation. The message selection notification represents a notification indicating that the message object 32 has been selected at a transmission source thereof, and is issued through the transmission of data having a format defined in advance. In this case, the transmission source represents the message display terminal 20 that has received the selection operation (message display terminal 20 of the user having conducted the selection operation).

The message selection notification includes information for identifying the message represented by the selected message object 32 (for example, message ID) and information for identifying the transmission source (for example, information for identifying the user or information for identifying the message display terminal 20). When the message object 32 is selected on the message display terminal 20 of each user, the message selection notification is transmitted from the message display terminal 20. In other words, the message selection notification is transmitted when the user conducts the selection operation.

[Display Control Unit]

The display control unit 60 is configured to display the chat image 30 on the display unit 25 based on the message data transmitted by the transmission/reception unit 58 described later. The display control unit 60 displays the message object 32 representing the message input by each user in the display mode that enables the inputter of the message to be identified.

The display mode that enables the inputter to be identified represents such a mode of display as to enable the inputter of the message represented by the message object 32 to be identified. The information for identifying the inputter is an image or a symbol string indicating the inputter, and in this case, corresponds to the avatar image 34. For example, the display control unit 60 displays the message object 32 and the information for identifying the inputter in association with each other. Specifically, the display control unit 60 displays the message object 32 so that a balloon is drawn from the avatar image 34, or connects the avatar image 34 and the message object 32 with a line. In addition, for example, the display control unit 60 may display the message object 32 and the avatar image 34 both in the same display mode (for example, in the same color, pattern, brightness, shape, or size), to thereby enable the inputter to be identified.

In this embodiment, the display control unit 60 displays a message object 32 (second message object) representing a message (second message) in a display mode that enables the user having conducted the selection operation to be identified as the inputter (user having input the second message) based on message data which relates to a message generated in response to the conducted selection operation and is generated through use of the selected message object 32 (first message object), the second message being determined based on a message (first message) represented by the selected message object 32. In this case, the data generation unit 70 described later generates the above-mentioned message data.

The message determined based on the message represented by the selected message object 32 is the same message as the message represented by the selected message object 32, or is a message obtained by changing a message represented by the selected message object 32. The "same message" described above represents a message having the same content as the message represented by the message object 32 selected by the selection operation (message that exactly matches the message represented by the message object 32 selected by the selection operation). Meanwhile, the "message obtained by changing" described above represents a message having a common part in the content with the message represented by the selected message object 32 (message that partially matches the message object 32 selected by the selection operation). A different part (part different from a diversion source) is not a part manually input by the user but a part obtained by adding or replacing another symbol string or image on the message transmission server 10 or the message display terminal 20 or a part obtained by deleting a part of the symbol string or image. A first embodiment is described by taking a case where the display control unit 60 displays the "same message" described above, and a modification example is described by taking a case where the display control unit 60 displays the "message obtained by changing".

The first embodiment is described by taking a case where, when any one of the users conducts a selection operation, the data generation unit 70 of the message transmission server 10 generates the message data in response to the selection operation. However, as described later in second and third embodiments of the present invention, the message data may also be generated by the message display terminal 20.

[1-3-2. Functions Achieved by Message Transmission Server]

On the message transmission server 10, a data storage unit 62, the transmission/reception unit 64, and the data generation unit 70 are achieved. For example, the data storage unit 62 is achieved mainly by the storage unit 12, the transmission/reception unit 64 is achieved mainly by the control unit 11 and the communication unit 13, and the data generation unit 70 is achieved mainly by the control unit 11.

[Data Storage Unit]

The data storage unit 62 is configured to store a message database for storing the message data. FIG. 5 is a table for showing a data storage example of the message database. As shown in FIG. 5, the message database stores a message ID, inputter information, a message, and time information in association with one another. Each record stored in the message database corresponds to the message data. The message data is data required for managing the message (for example, specifying or displaying the message), and in this case, can be said to be data including data required for displaying the message. The message ID shown in FIG. 5 represents information for uniquely identifying each message. The inputter information represents information for identifying the inputter, and in this case, is information for identifying the user having input (transmitted) the message. The time information represents a time of the input of the message. The time information may be indicated by date and time, or may be indicated only by time.

The data stored on the data storage unit 62 is not limited to the above-mentioned example. It suffices that the data storage unit 62 stores data for achieving an exchange of a message between users. For example, the data storage unit 62 may store information for identifying users having joined a chat and detailed information on the respective users. In addition, for example, the data storage unit 62 may store various kinds of image data including the message object 32 and the avatar image 34.

[Transmission/Reception Unit]

The transmission/reception unit 64 is configured to transmit and receive various kinds of data to and from the transmission/reception unit 58. In this case, the transmission/reception unit 64 includes a notification reception portion 66 and a data transmission portion 68. The notification reception portion 66 is configured to receive, from the message display terminal 20 of each user, the message input notification indicating that a message has been input. The notification reception portion 66 is further configured to receive, from the message display terminal 20 of each user, the message selection notification indicating that the message object 32 representing the message has been selected.

The data transmission portion 68 is configured to transmit the message data generated by the data generation unit 70 to the message display terminal 20 of each user. For example, the data transmission portion 68 transmits the message data input by each user to each message display terminal 20.

Further, for example, the data transmission portion 68 transmits, in response to the message selection notification received by the transmission/reception unit 64, the message data relating to the message determined based on the message represented by the selected message object 32 (in this embodiment, message data relating to the same message as the message represented by the selected message object 32) to the message display terminal 20 of each user with the user of the transmission source of the message selection notification being set as the inputter.

[Data Generation Unit]

The data generation unit 70 is configured to generate, when the message input notification or the message selection notification is received, the message data based on the content of the received notification. For example, the data generation unit 70 issues, in response to the message input notification received by the transmission/reception unit 64, a message ID to the message indicated by the message input notification, and stores the message in the message database along with the inputter information indicating the transmission source of the message input notification and a current date and time.

Further, for example, the data generation unit 70 generates, in response to the message selection notification received by the transmission/reception unit 64, through the use of the selected message object 32 (first message object), the message data determined based on the message represented by the selected message object 32 (first message) (in this case, the same message as the message represented by the selected message object 32; that is, second message) with the user of the transmission source of the message selection notification being set as the inputter (user having input the second message).

The use of the selected message object 32 is the use of information for identifying the message represented by the selected message object 32 (in this case, message ID), and can also be said to be the reference to the information stored in the message data represented by the selected message object 32. In this case, the data generation unit 70 identifies the message ID of the message represented by the message object 32 selected by the selection operation, assigns a new message ID to the message determined based on the message indicated by the identified message ID (in this embodiment, the same message as the message indicated by the message ID identified above), and stores the message in the message database along with the inputter information indicating the transmission source of the message selection notification and the current date and time. That is, when the message selection notification is received, the data generation unit 70 can automatically generate the message data without the need to receive any notification after that.

[1-4. Processing Executed by Message Control System]

Figure 6:
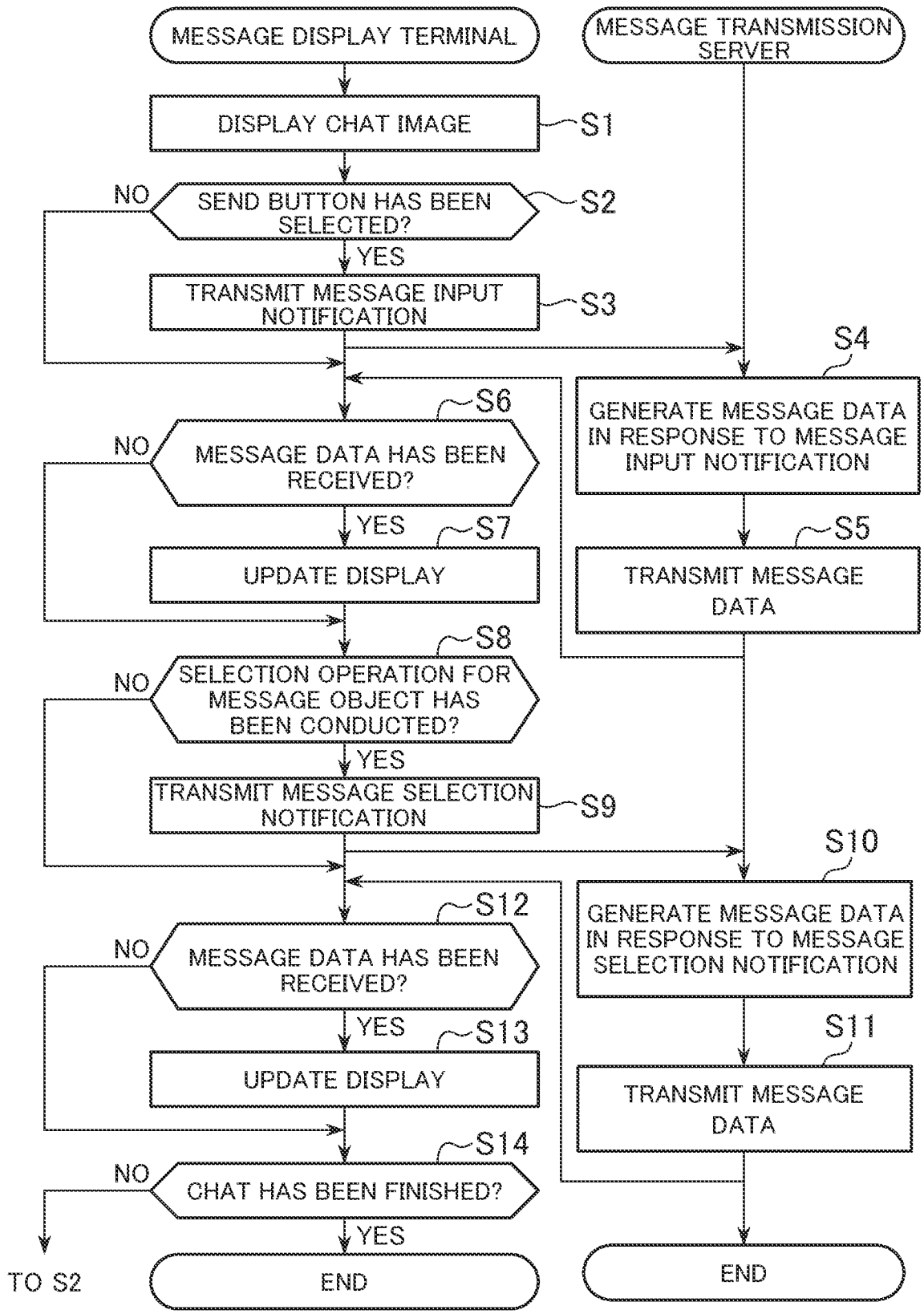
FIG. 6 is a flowchart for illustrating processing executed by the message control system.

FIG. 6 is a flowchart for illustrating processing executed by the message control system 1. When a chat joined by a plurality of users starts, the processing illustrated in FIG. 6 is executed by the control unit 11 operating in accordance with a program stored on the storage unit 12 and by the control unit 21 operating in accordance with a program stored on the storage unit 22. The processing described below is executed, to thereby achieve the functional blocks illustrated in FIG. 4. In FIG. 6, only one message display terminal 20 is illustrated for the sake of brevity, but the same processing is executed on the respective message display terminals 20.

First, as illustrated in FIG. 6, on the message display terminal 20, the control unit 21 displays the chat image 30 on the display unit 25 (S1). The chat image 30 displayed in Step S1 is an initial screen, and hence the message object 32 is not displayed yet. In this embodiment, a chat is conducted during execution of a game, and hence the game is assumed to be progressing as well based on operations of the respective users.

The control unit 21 determines whether or not the send button 38 has been selected with a message having been input into the input form 36 (S2). The user can transmit a message by operating the operation unit 24 to input the symbol string and the image into the input form 36 and to select the send button 38. The send button 38 may be inhibited from being selected with no message having been input into the input form 36.

When it is determined that the send button 38 has been selected (Y in S2), the control unit 21 transmits the message input notification to the message transmission server 10 (S3). When the notification is transmitted from each message display terminal 20 to the message transmission server 10, the user ID (information for identifying the message display terminal 20, the user operating the message display terminal 20, or the like) and others is also transmitted, and the message transmission server 10 can identify which message display terminal 20 or which user the notification has been received from.

When the message transmission server 10 receives the message input notification, the control unit 11 generates message data in response to the message input notification (S4). In Step S4, a new message ID is issued to the message indicated by the message input notification, and the message is stored in the message database after the message ID is associated with the inputter information and the current time. The message ID may be issued based on predetermined ID issuing rules so as to avoid a conflict with another message ID. Further, this embodiment is described by taking a case where the message is associated with the current time, but the message may be associated with a time at which the message was recorded on the message display terminal 20 at a time of the input of the message. The above-mentioned time is acquired on the message display terminal 20, and is included in the message input notification.

The control unit 11 transmits the generated message data to each message display terminal 20 (S5). The information (for example, IP address) for identifying the message display terminal 20 of each user having joined the chat is stored in the storage unit 12 in advance, and the message transmission server 10 can identify the transmission destination of the message data.

On the message display terminal 20, the control unit 21 determines whether or not the message data has been received from the message transmission server 10 (S6). When it is determined that the message data has been received (Y in S6), the control unit 21 updates the display of the chat image 30 based on the received message data (S7). In Step S7, the control unit 21 updates the display of the chat image 30 so that the message object 32 of the message indicated by the received message data is displayed in the uppermost layer.

The control unit 21 determines whether or not the selection operation for the message object 32 has been conducted (S8). In Step S8, the control unit 21 determines based on the signal received from the operation unit 24 which of the message objects 32 displayed on the display unit 25 has been selected.

When it is determined that the selection operation has been conducted (Y in S8), the control unit 11 transmits the message selection notification to the message transmission server 10 (S9). As described above, the message selection notification transmitted in Step S9 includes the message ID of the message represented by the message object 32 selected by the selection operation.

When the message transmission server 10 receives the message selection notification, the control unit 11 generates the message data in response to the message selection notification (S10). In Step S10, a new message ID is issued to the same message as the message indicated by the message selection notification, and the message is stored in the message database after the message ID is associated with the inputter information indicating the user having conducted the selection operation and the current time. The subsequent processing of Step S11 to Step S13 are the same as the processing of Step S5 to Step S7, respectively. Those steps of processing are executed, to thereby display the message object 32 representing the message diverted by the user on the display unit 25 of each user.

The control unit 21 determines whether or not the chat has been finished (S14). The chat is finished when the condition defined in advance is satisfied, and for example, is finished when anyone of the users conducts a predetermined operation for finishing the chat or when the game is cleared. When it is not determined that the chat has been finished (N in S14), the procedure returns to the processing of Step S2. Meanwhile, when it is determined that the chat has been finished (Y in S14), this processing is brought to an end.

According to the message control system 1 described above, the user can select the message object 32 to divert the message represented by the message object 32, which can alleviate time and labor to input a message. In particular, there is often no time to bother to input a message while having a chat during a game, and hence it is particularly useful to omit the time and labor by diverting the message. In addition, it is sometimes important to liven up a game by quickly transmitting a message rather than by conveying the content with accuracy, and in such a game, it is possible to effectively liven up the game by quickly giving utterance by diverting a message.

Further, as in the first embodiment, when the user inputs a message into the input form 36 and selects the send button 38 to transmit the message, it is possible to transmit his or her own message only by conducting the selection operation for selecting the message object 32 without bothering to input the message into the input form 36 and to select the send button 38.

2. Second Embodiment

The first embodiment is described by taking the case where the message transmission server 10 generates the message data, but a place to generate the message data is not limited to the message transmission server 10. In addition, for example, the message data may be generated on the message display terminal 20 that has received the transmission operation for the message or the selection operation for the message object 32. In the following, descriptions of the same points as those of the first embodiment are omitted, and different points from those of the first embodiment are described.

Figure 7:
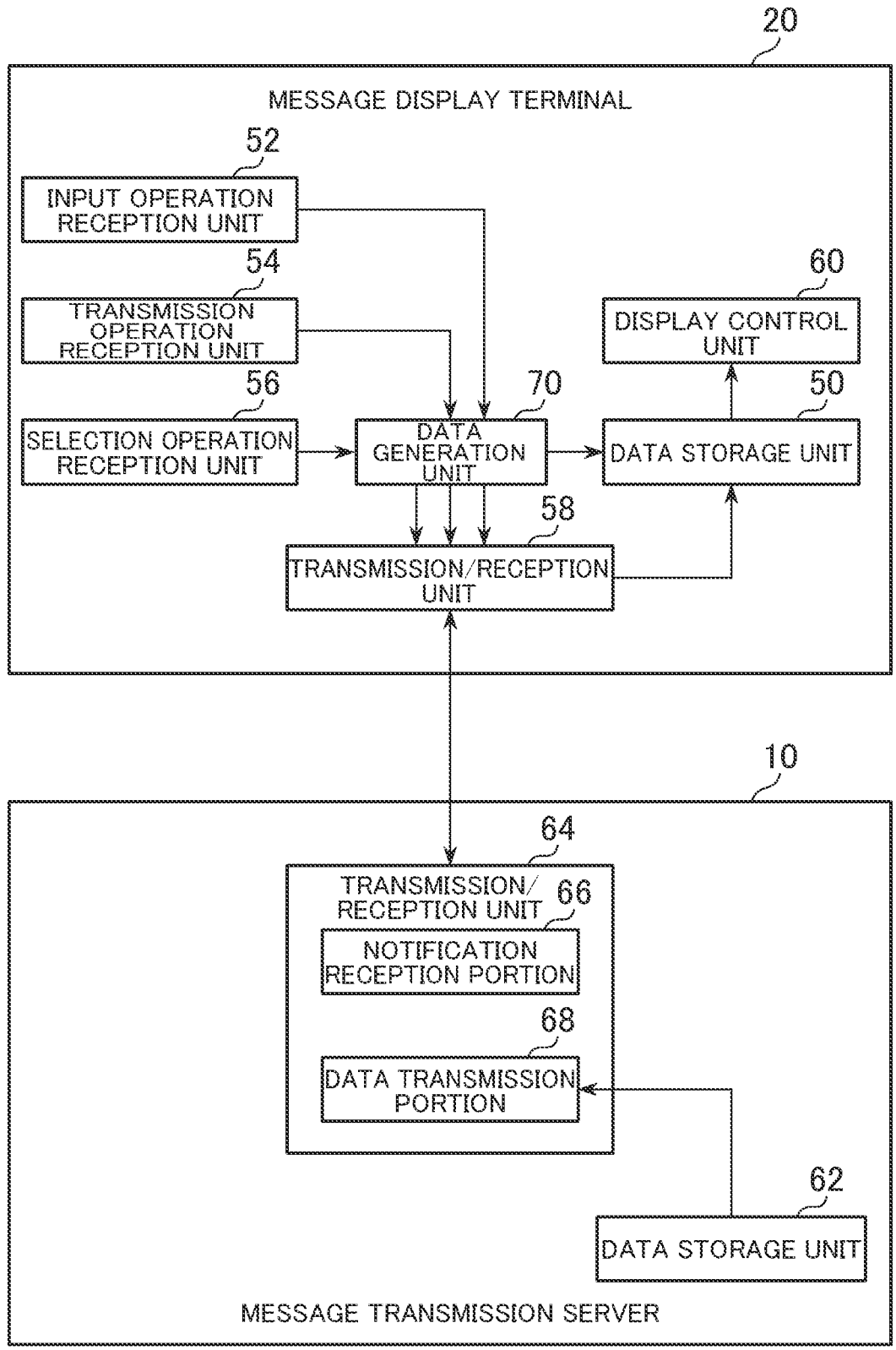
FIG. 7 is a functional block diagram of a second embodiment of the present invention.

FIG. 7 is a functional block diagram of the second embodiment. As illustrated in FIG. 7, in the second embodiment, the data generation unit 70 is achieved on the message display terminal 20. In this case, the data generation unit 70 is achieved mainly by the control unit 21. For example, when the transmission operation reception unit 54 receives the transmission operation after the input operation reception unit 52 receives the input of the message, the data generation unit 70 generates message data relating to the input message. In this case, the data generation unit 70 generates the message data by issuing a message ID to the input message and associating the message ID with the inputter information and the current time.

In the same manner, when the selection operation reception unit 56 receives the selection operation, the data generation unit 70 generates message data. The data generation unit 70 generates the message data by issuing a message ID to a message determined based on the message represented by the message object 32 selected by the selection operation (in this case, the same message as the message represented by the message object 32 selected by the selection operation) and associating the message ID with the inputter information and the current time.

The transmission/reception unit 58 of the message display terminal 20 transmits the data generated by the data generation unit 70 to the message transmission server 10. When receiving the message data, the transmission/reception unit 64 of the message transmission server 10 stores the message data in the message database, and distributes the message data to the respective message display terminals 20. When the transmission/reception unit 58 of the message display terminal 20 receives the message data from the message transmission server 10, the display control unit 60 updates the display of the chat image 30. The processing for updating the display itself is the same as that of the first embodiment.

Figure 8:
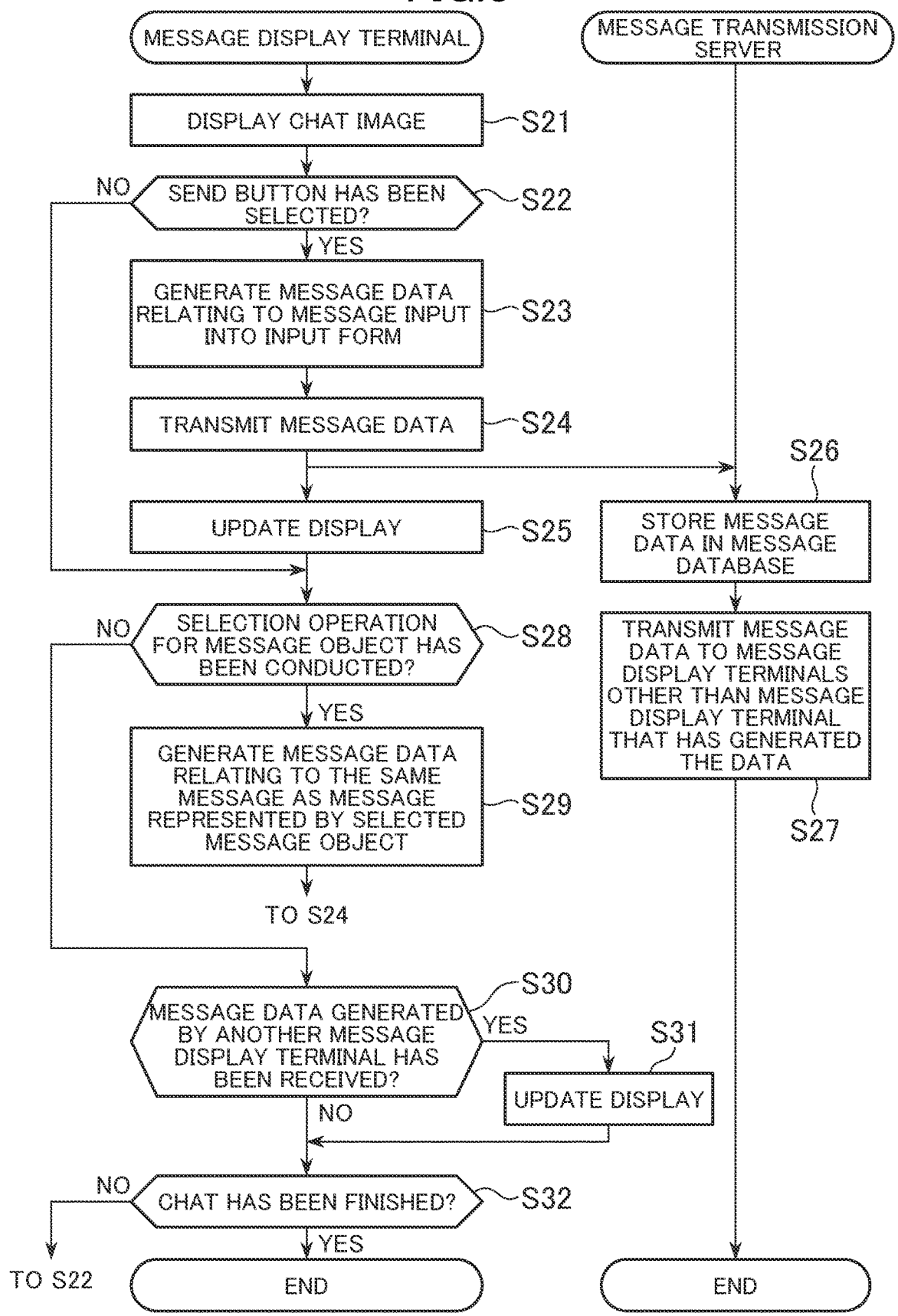
FIG. 8 is a flowchart for illustrating processing executed by a message control system according to the second embodiment.

FIG. 8 is a flowchart for illustrating processing executed by the message control system 1 according to the second embodiment. As illustrated in FIG. 8, Step S21 and Step S22 are the same as Step S1 and Step S2, respectively. When it is determined in Step S22 that the send button 38 has been selected (Y in S22), the control unit 21 generates message data relating to the message input into the input form 36 (S23). The processing content of Step S23 is the same as that of Step S4, and the control unit 21 generates the message data by issuing a message ID to the message input into the input form 36 and associating the message ID with the inputter information and the current time.

The control unit 21 transmits the message data to the message transmission server 10 (S24). The control unit 21 updates the display of the chat image 30 based on the message data generated in Step S23 (S25). The processing of Step S25 is the same as the processing of Step S7.

When the message transmission server 10 receives the message data, the control unit 11 stores the data in the message database (S26). The control unit 11 transmits the message data to the message display terminals 20 other than the message display terminal 20 that has generated the data (S27). The processing of Step S27 is the same as the processing of Step S5, but there is no need to transmit the data to the message display terminal 20 that has generated the message data, and hence in Step S27, the data is transmitted to the other message display terminals 20.

Meanwhile, when it is not determined that the send button 38 has been selected on the message display terminal 20 (N in S22), the control unit 21 determines whether or not the selection operation for the message object 32 has been conducted (S28). The processing of Step S28 is the same as the processing of Step S8.

When it is determined that the selection operation for the message object 32 has been conducted (Y in S28), the control unit 21 generates the message data relating to the same message as the message represented by the selected message object 32 in response to the selection operation (S29), and the procedure proceeds to the processing of Step S24. The processing content of Step S29 is the same as that of Step S10, and the control unit 21 generates the message data by issuing a message ID to the same message as the message represented by the selected message object 32 and associating the message ID with the inputter information and the current time.

Meanwhile, when it is not determined that the selection operation for the message object 32 has been conducted (N in S28), the control unit 21 determines whether or not the message data generated by another message display terminal 20 has been received (S30). In Step S30, the control unit 21 determines whether or not the message data generated on another message display terminal 20 (that is, data generated by another message display terminal 20 in the processing of Step S23 or Step S29) has been received through the message transmission server 10.

When it is determined that the message data generated by another message display terminal 20 has been received (Y in S30), the control unit 21 updates the display of the chat image 30 based on the received data (S31). The processing content of Step S31 is the same as that of Step S7 or Step S13. Further, the subsequent processing of Step S32 is the same as the processing of Step S14.

According to the second embodiment, it is possible to conduct the same display control as that of the first embodiment by generating the message data on the message display terminal 20, which can alleviate the time and labor to input a message. Further, the processing for generating the message data is executed by the message display terminal 20 instead of being executed by the message transmission server 10, to thereby be able to alleviate a load imposed on the message transmission server 10.

The second embodiment is described by taking the case where the message ID of the message represented by the message object 32 selected by the user or the like is stored on the message display terminal 20, but the data may be obtained by querying the message transmission server 10 to acquire the data at a timing at which the selection operation is conducted, instead of being stored on the message display terminal 20.

3. Third Embodiment

Further, the first embodiment is described by taking the case where the message transmission server 10 generates the message data when the message transmission server 10 receives the message input notification or the message selection notification, but the message transmission server 10 may transfer the message input notification or the message selection notification to the respective message display terminals 20, and then each of the message display terminals 20 may generate the message data at a timing to display the message object 32. In the following, descriptions of the same points as those of the first or second embodiment are omitted, and different points therefrom are described.

Figure 9:
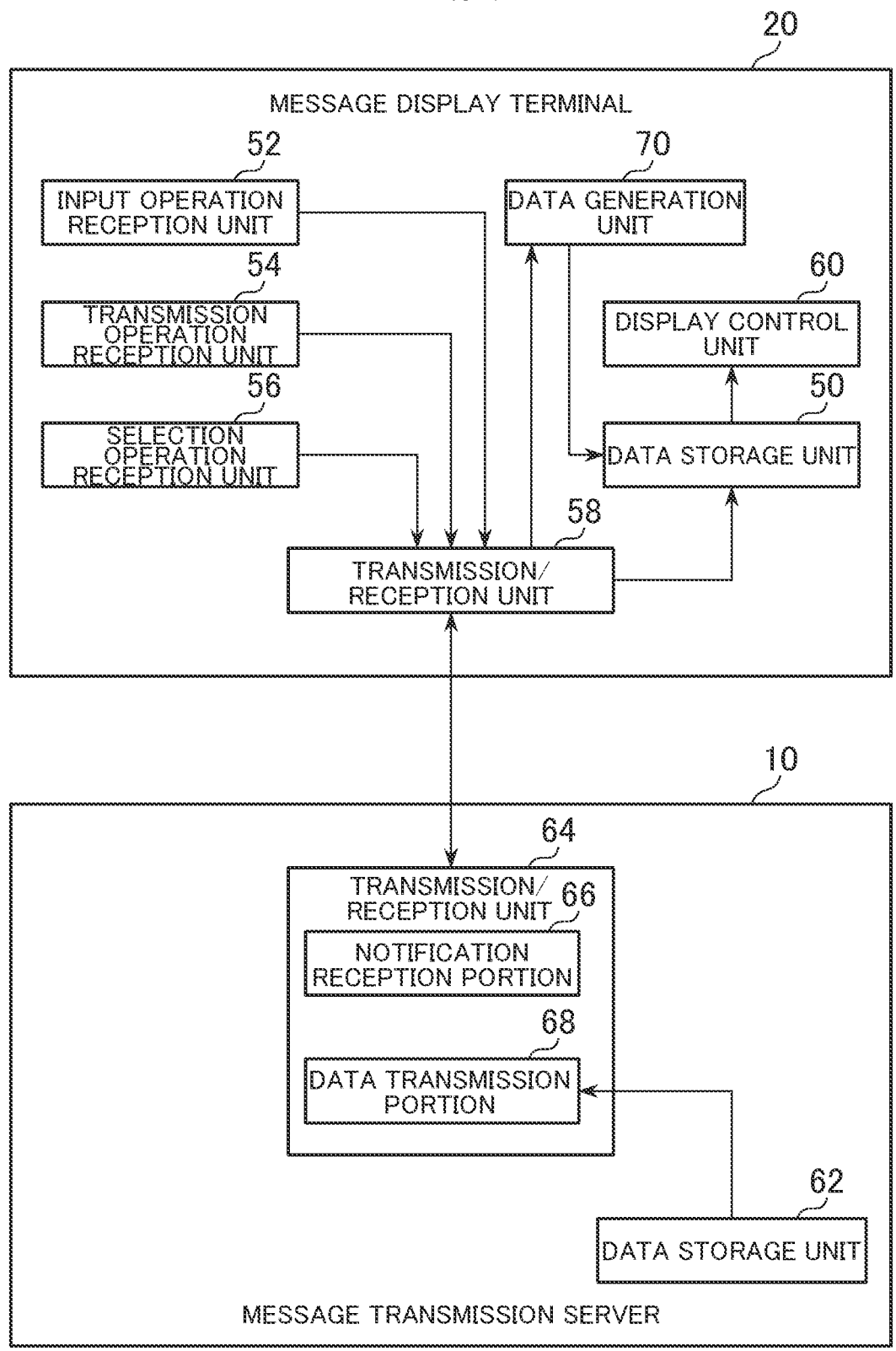
FIG. 9 is a functional block diagram of a third embodiment of the present invention.

FIG. 9 is a functional block diagram of the third embodiment. As illustrated in FIG. 9, in the third embodiment, the data generation unit 70 is achieved on the message display terminal 20. Further, in the third embodiment, the transmission/reception unit 64 of the message transmission server 10 transfers the message input notification or the message selection notification to the respective message display terminals 20 as it is. Further, in the third embodiment, the data generation unit 70 is achieved on the message display terminal 20 in the same manner as in the second embodiment.

When receiving the message input notification transferred by the message transmission server 10, the data generation unit 70 generates message data relating to the input message in response to the message input notification. The generation method itself is the same as that of the first embodiment. For example, when receiving the message input notification transmitted by another message display terminal 20, the data generation unit 70 of a given message display terminal 20 generates the message data relating to the input message in response to the message input notification. That is, the data generation unit 70 generates the message data at the timing to display the message object 32.

In the same manner, when receiving the message selection notification transferred by the message transmission server 10, the data generation unit 70 generates message data in response to the message selection notification. The generation method itself is the same as that of the first embodiment. For example, when receiving the message input notification transmitted by another message display terminal 20, the data generation unit 70 of a given message display terminal 20 generates the data relating to the message determined based on the message represented by the selected message object 32 (in this case, the same message as the message represented by the selected message object 32) in response to the message selection notification. In this respect, the message input notification including only the information of the message ID or the like is received in the third embodiment while the message data itself is received from the another message display terminal 20 in the second embodiment, and hence it is possible to omit the transmission or reception of the data relating to the content input on the another message display terminal 20. The display control unit 60 updates the display of the chat image 30 based on the above-mentioned data generated by the data generation unit 70. The processing for updating the display itself is the same as that of the first or second embodiment.

Figure 10:
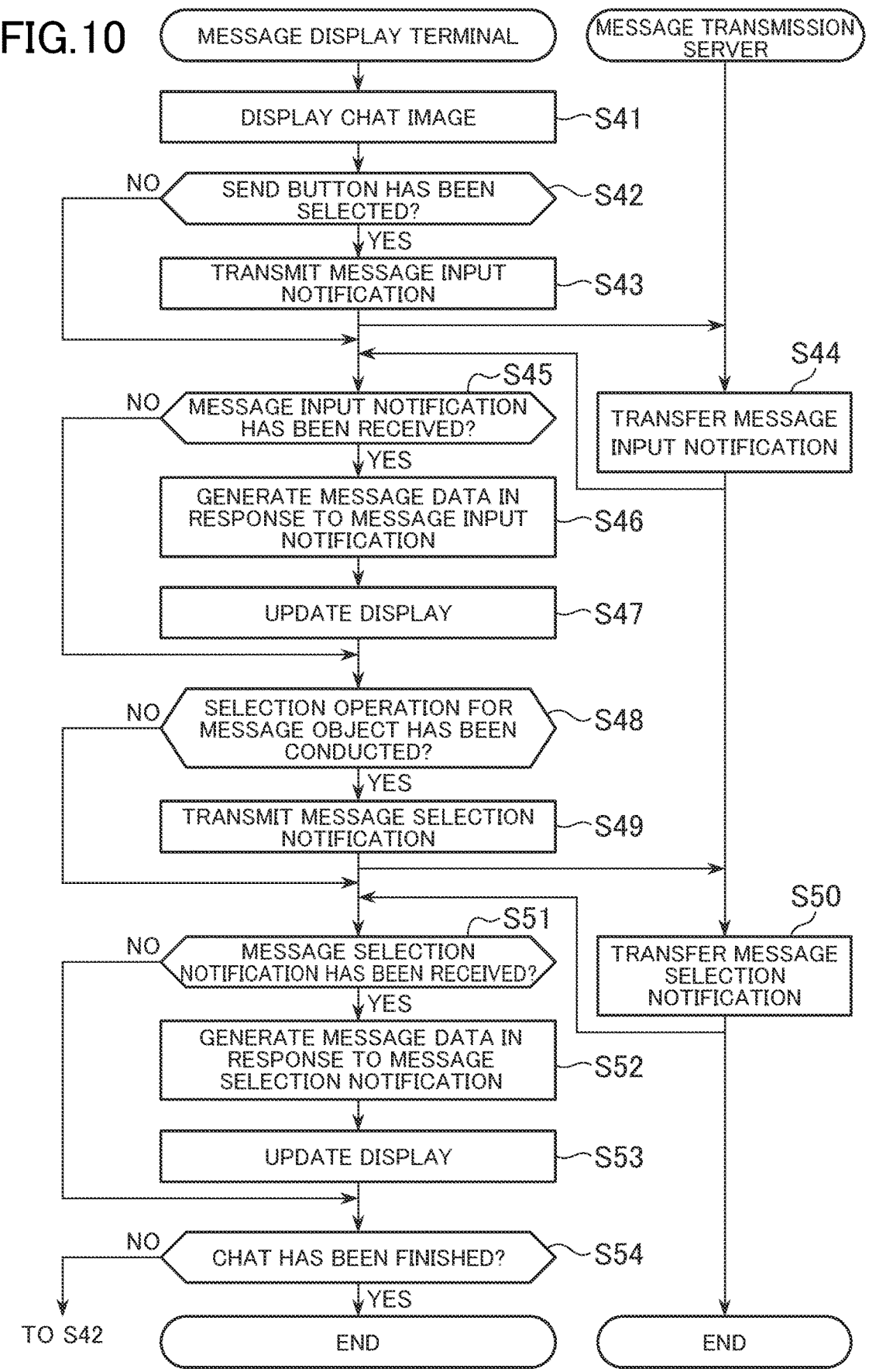
FIG. 10 is a flowchart for illustrating processing executed by a message control system according to the third embodiment.

FIG. 10 is a flowchart for illustrating processing executed by the message control system 1 according to the third embodiment. As illustrated in FIG. 10, Steps S41 to S43 are the same as Steps S1 to S3, respectively. When the message transmission server 10 receives the message input notification, the control unit 11 transfers the message input notification to the respective message display terminals 20 (S44).

On the message display terminal 20, the control unit 21 determines whether or not the message input notification has been received (S45). When it is determined that the message input notification has been received (Y in S45), the control unit 21 generates message data in response to the message input notification (S46), and updates the display of the chat image 30 (S47). The processing content of Step S46 is the same as that of Step S5, and the processing content of Step S47 is the same as that of Step S7. When it is determined in Step S45 that the message input notification transmitted by another message display terminal 20 has been received, in the subsequent Step S46, the message data relating to the message input on the another message display terminal 20 is generated in response to the message input notification transmitted by the another message display terminal 20.

The subsequent Step S48 and Step S49 are the same as Step S8 and Step S9, respectively. When the message transmission server 10 receives the message selection notification, the control unit 11 transfers the message selection notification to the respective message display terminals 20 (S50).

On the message display terminal 20, the control unit 21 determines whether or not the message selection notification has been received (S51). When it is determined that the message selection notification has been received (Y in S51), the control unit 21 generates the message data in response to the message selection notification (S52), and updates the display of the chat image 30 (S53). The processing content of Step S52 is the same as that of Step S10, and the processing content of Step S53 is the same as that of Step S13. The subsequent Step S54 is the same as Step S14. When it is determined in Step S51 that the message selection notification transmitted by another message display terminal 20 has been received, in the subsequent Step S52, the message data relating to the same message as the message represented by the message object 32 selected on the another message display terminal 20 is generated in response to the message selection notification transmitted by the another message display terminal 20.

According to the third embodiment, it is possible to conduct the same display control as that of the first or second embodiment by generating the message data on the message display terminal 20, which can alleviate the time and labor to input a message. Further, in the same manner as in the second embodiment, the processing for generating the message data is executed by the message display terminal 20 instead of being executed by the message transmission server 10, to thereby be able to alleviate a load imposed on the message transmission server 10. Further, the message data is transmitted and received in the second embodiment, but in the third embodiment, it suffices that the message selection notification having a data amount smaller than that of the message data is transmitted and received, which can also alleviate a communication amount on a network.

4. Modification Examples

The present invention is not limited to the embodiments described above, and can be modified suitably without departing from the spirit of the present invention.

Figure 11:
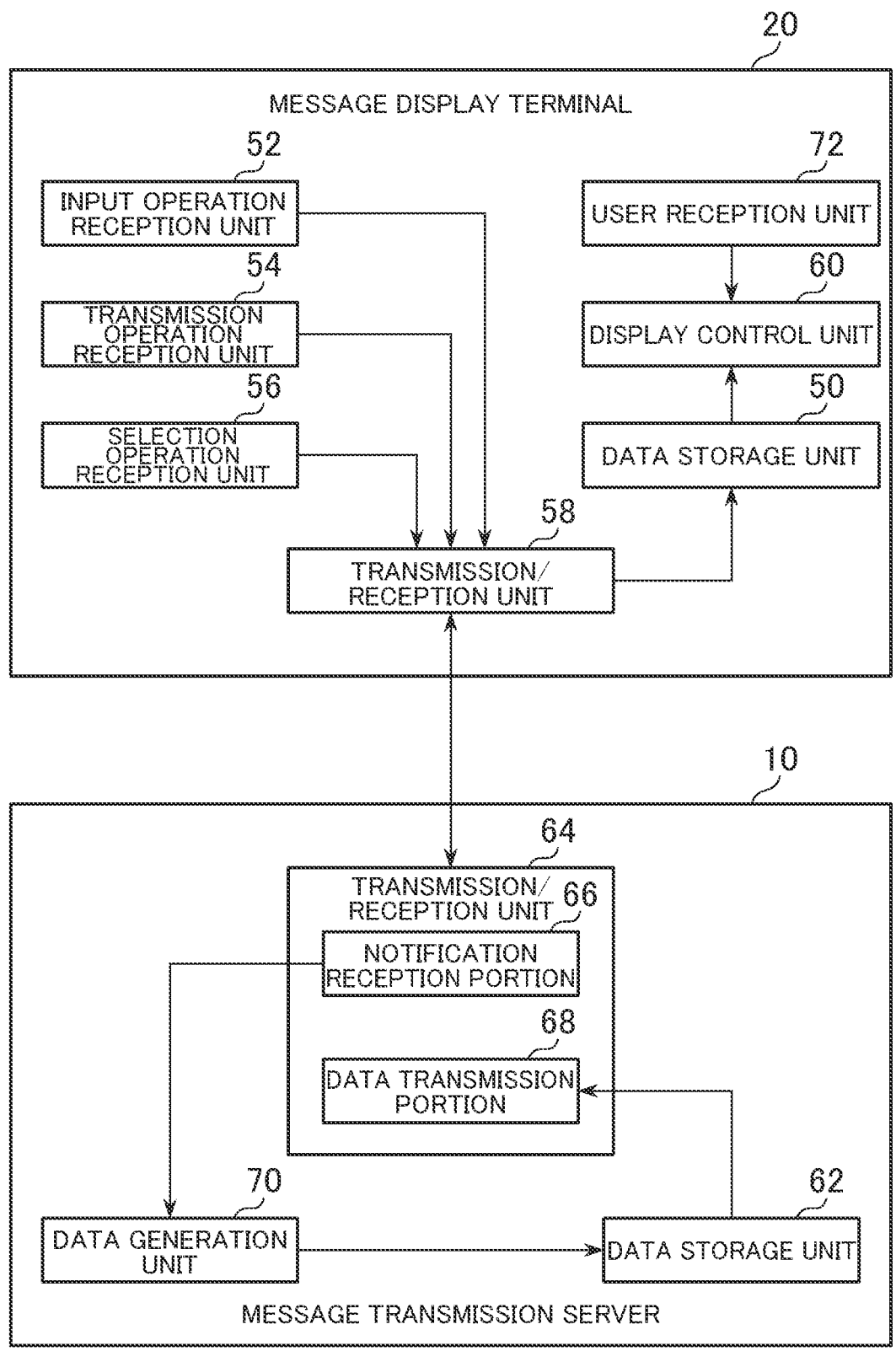
FIG. 11 is a functional block diagram of a modification example of the present invention.

FIG. 11 is a functional block diagram of a modification example of the present invention. As illustrated in FIG. 11, in the modification example, a user reception unit 72 is achieved in addition to the functions of the embodiments. The user reception unit 72 is achieved mainly by the control unit 21 and the operation unit 24. FIG. 11 is an illustration based on the functional blocks according to the first embodiment, but when the message data is generated as in the second or third embodiment, the data generation unit 70 is achieved on the message display terminal 20.

(1) For example, the message object 32 disappears after the fixed time period has elapsed, and hence the message object 32 may be allowed to be selected from a history of messages of each user so that the message that has already disappeared can be diverted. In this case, when the avatar image 34 is selected, the history of the messages of the user indicated by the selected avatar image 34 is displayed.

Figure 12:
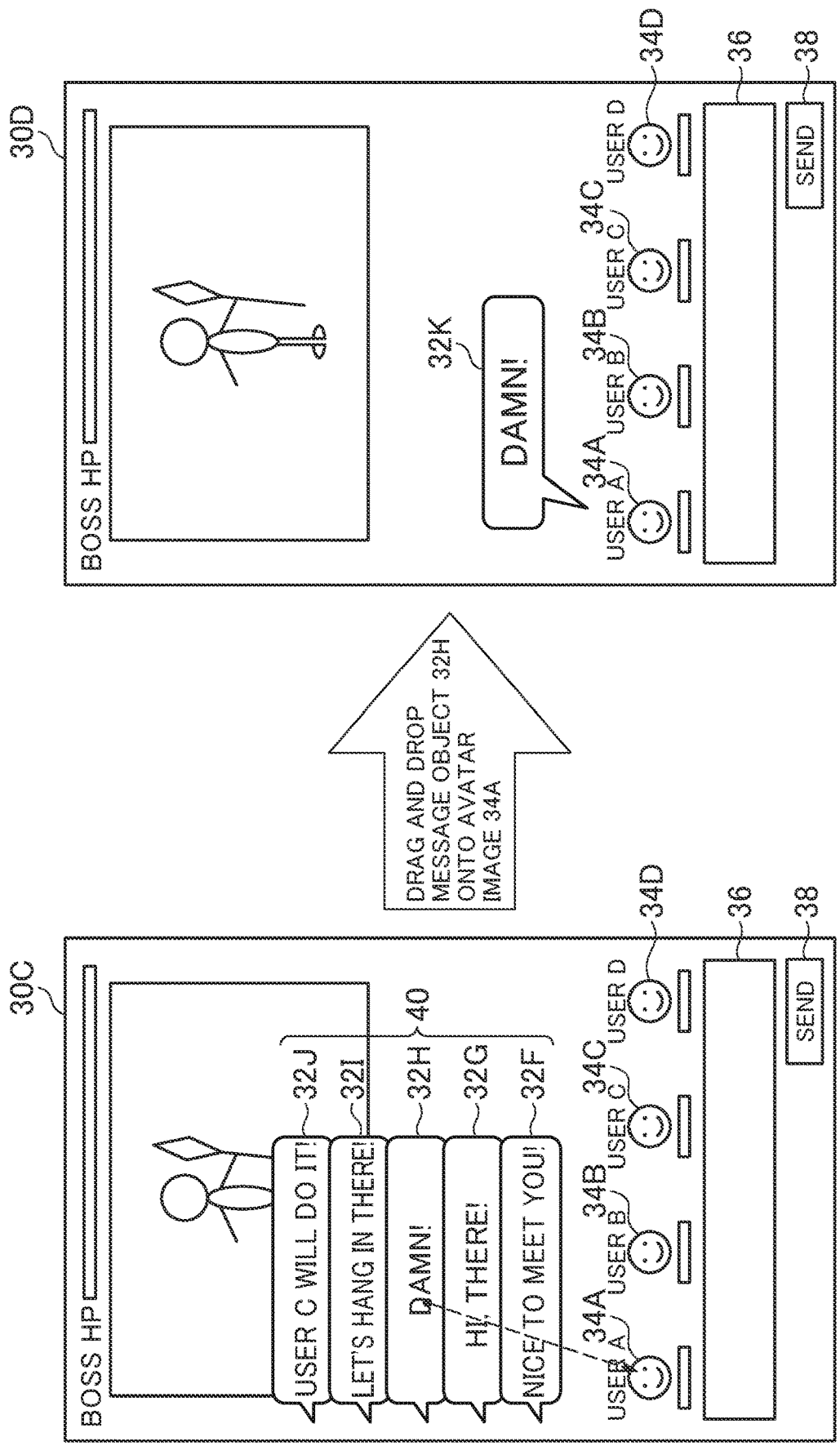
FIG. 12 is a diagram for illustrating the chat image displayed on the message display terminal of the user.

FIG. 12 is a diagram for illustrating the chat image 30 displayed on the message display terminal 20 of the user A. As illustrated in FIG. 12, for example, when the user A selects the avatar image 34D of the user D, a history image 40 representing the history of the messages of the user D indicated by the avatar image 34D is displayed (in the state of a chat image 30C). The history of the messages represents the history of the past messages input by a given user, and may be messages stored for the entire past period, or may be only messages stored within a period determined based on a current time point (for example, period earlier than the current time point by a predetermined time period). In addition, for example, the history of the messages may be only the last predetermined number of messages including the most recent message.

The user reception unit 72 is configured to receive an operation for selecting at least one of user objects (in this case, avatar images 34) representing a respective plurality of users. The user object is an image for identifying each user, and may be, for example, an image for identifying the user's name in addition to the avatar image 34. The user object may not only be expressed two-dimensionally as in the case of the avatar image 34, but also be expressed three-dimensionally within a virtual space. The display control unit 60 refers to the data storage unit 50 to identify the history of the messages of the user indicated by the selected avatar image 34 and to display the history image 40 representing the history. In this case, the history image 40 is formed of message objects 32F to 32J representing respective messages included in the history.

The selection operation reception unit 56 according to this modification example receives a selection operation for selecting the message object 32 displayed based on the history information relating to the message objects 32 that have been displayed (that is, information representing the history of the displayed message objects 32; in this case, message data relating to the messages that have already been input to be stored on the data storage unit 50). For example, the selection operation reception unit 56 receives a selection operation for selecting the message object representing each message included in the history. The processing conducted after the selection operation is received is the same as that of the first embodiment. That is, in the example illustrated in FIG. 12, when the user A drags and drops the message object 32H onto his or her own avatar image 34A from among the message objects 32F to 32J representing the respective messages included in the history, a message object 32K representing the same message as the message represented by the message object 32H is displayed (in the state of a chat image 30D).

The selection operation reception unit 56 may be configured to receive a selection operation for selecting the message object 32 displayed based on the history information on the selected inputter (in this case, user represented by the selected avatar image 34). That is, the selection operation reception unit 56 receives the selection operation from within the history of the message objects 32 representing the messages that have been input by the selected inputter among all the histories. For example, the selection operation reception unit 56 may be configured to receive the selection operation for selecting the message object 32 from within the history of the messages input by the user for each of a plurality of users. For example, in units of respective users corresponding to the avatar images 34 selected by the user, the display control unit 60 displays the history images 40 representing the histories of the messages that have been input by the respective users. Then, the selection operation reception unit 56 receives the selection operation for selecting the message object 32 from within the histories represented by the respective history images 40.

Further, the display control unit 60 may be configured to display the message objects 32 so as to avoid redundancy between the same messages based on the history information. That is, the display control unit 60 displays the message objects 32 representing the respective messages included in the history of the messages so as to avoid redundancy between the same messages. The display control unit 60 compares the respective messages included in the history with one another so as to inhibit duplicate messages from being respectively displayed as separate message objects 32. For example, in a screen example illustrated in FIG. 12, even when the user D has input the message "Damn!" a plurality of times, only one message object 32H representing this message is displayed within the history image 40.

According to Modification Example (1), by selecting the message object 32 from the history of the messages of a given user, each user can transmit the same message as the selected message as the message input by himself or herself, which can alleviate the time and labor to input a message.

Further, by selecting the message object 32 from the histories of the messages of the respective users in units of the respective users, each user can transmit the same message as the selected message as the message input by himself or herself, which can alleviate the time and labor to input a message. In addition, it is possible to narrow down candidates for the message object 32 in units of inputters, which enables the intended message object 32 to be retrieved more quickly.

Further, when the message object 32 is selected from the history of the messages, there is no redundancy between the same messages, and hence it becomes easier to select the message object 32. That is, when there are a plurality of the same messages in the history, it is possible to prevent the display from being filled with the message objects 32 having the same content.

The above description is directed to the case where the message transmission server 10 generates the message data as in the first embodiment, but the message display terminal 20 may be configured to generate the data also in Modification Example (1) as in the second or third embodiment. Also in this case, as described in the second or third embodiment, the message data is generated on the message display terminal 20 when the message object 32 is selected from the history.

(2) Further, for example, when the user A diverts the message of the user D, the message of the user D of the diversion source and the message of the user A have the same content, and may therefore be displayed collectively. The display control unit 60 according to this modification example displays the message object 32 (second message object), which represents the same message (second message) as the message (first message) represented by the selected message object 32 (first message object), and the selected message object 32 in association with each other. In this case, the message data generated by the data generation unit 70 is assumed to include the message ID of the message of the diversion source (that is, message ID of the message represented by the message object 32 selected by the user). This enables the message of the diversion source to be identified.

Figure 13:
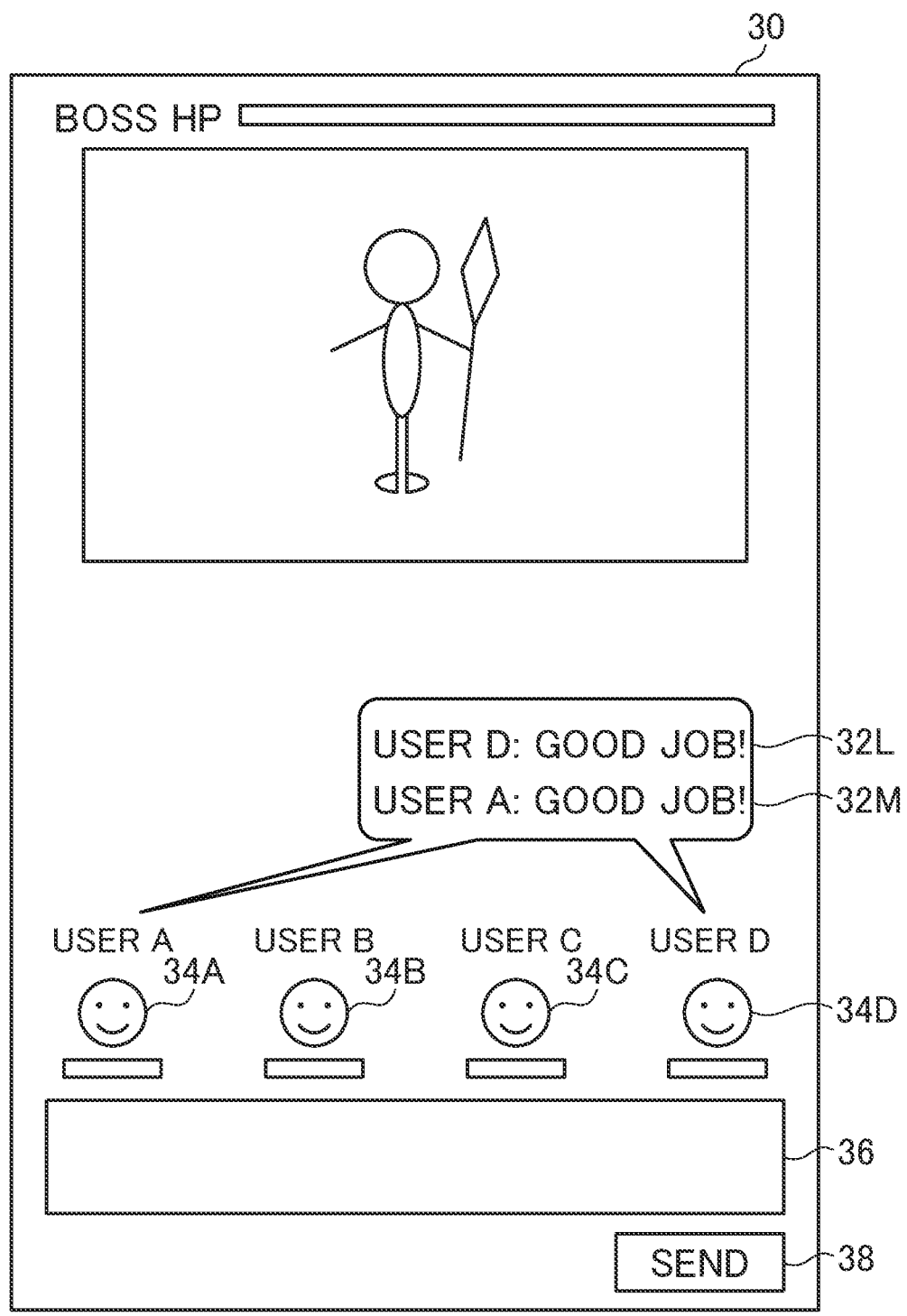
FIG. 13 is a diagram for illustrating the chat image displayed on the message display terminal of the user.

FIG. 13 is a diagram for illustrating the chat image 30 displayed on the message display terminal 20 of the user A. As illustrated in FIG. 13, the display control unit 60 collectively displays a message object 32L representing the message of the user D of the diversion source and a message object 32M representing the message of the user A, which is created by diverting the message of the user D, in association with each other. Also in this case, the display control unit 60 displays the respective message objects 32L and 32M in the display mode that enables the users A and D to be identified. The display mode that enables the users to be identified has the same meaning as that of the first embodiment.

Further, the method of associating the message objects 32 with one another is not limited to the above-mentioned example. The display control unit 60 may be configured to display the respective plurality of message objects 32 in the display mode that enables the mutual association to be identified. In addition to the display mode illustrated in FIG. 13, the display control unit 60 may be configured to associate the plurality of message objects 32 with one another by connecting the plurality of message objects 32 with a line or enclosing the plurality of message objects 32. In addition, for example, the display control unit 60 may be configured to associate the plurality of message objects 32 with one another by displaying the plurality of message objects 32 in the same display mode (for example, in the same color, pattern, brightness, shape, size, or font) or by aligning the plurality of message objects 32 in a line.

According to Modification Example (2), by displaying the message objects 32 in association with one another, it is possible to make the message objects 32 more visible.

The display control unit 60 may be configured to display one message object 32 (second message object) representing the same message (second message) as the message (first message) represented by the selected message object 32 (first message object) and the message represented by the selected message object 32.

Figure 14:
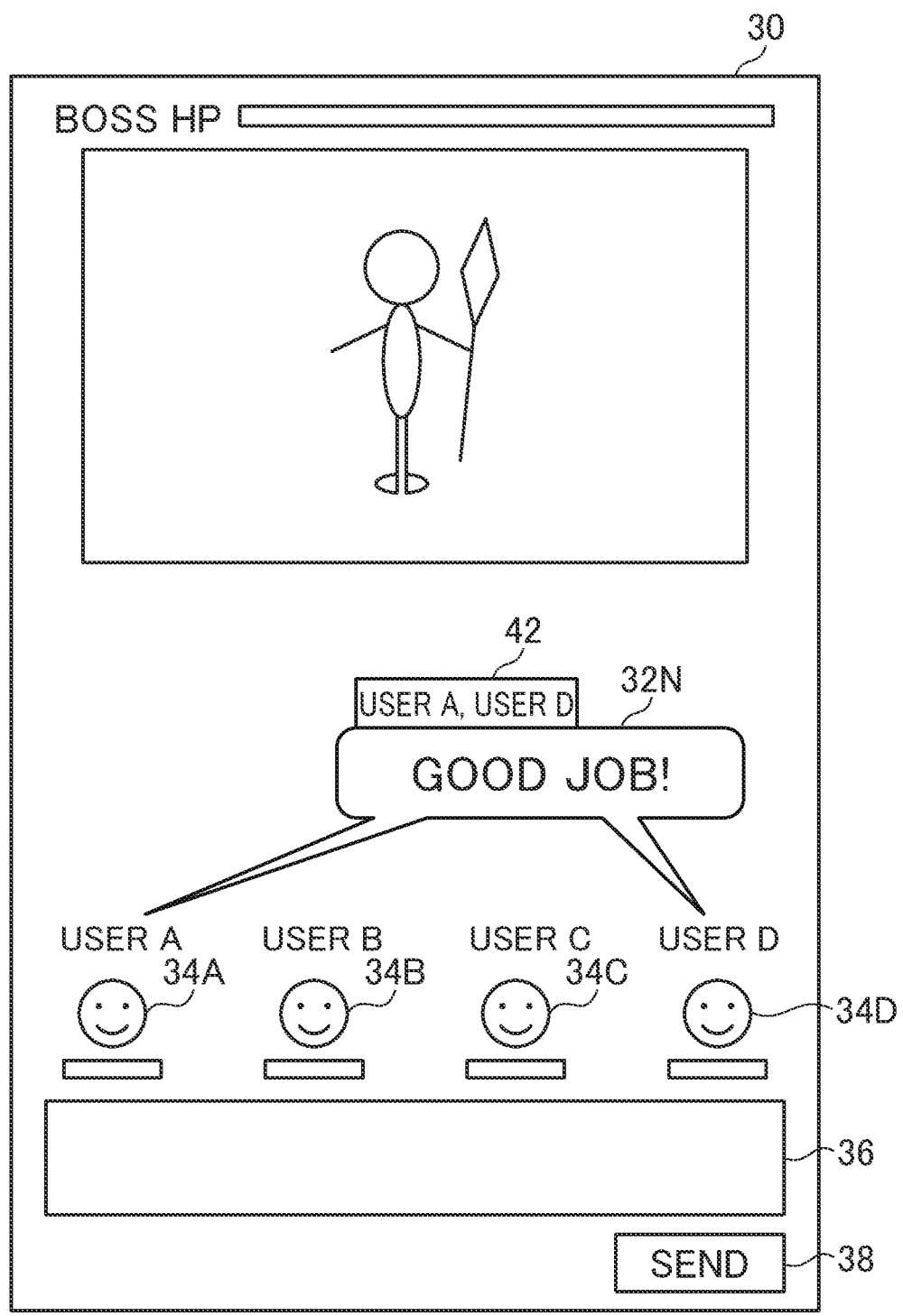
FIG. 14 is a diagram for illustrating the chat image displayed on the message display terminal of the user.

FIG. 14 is a diagram for illustrating the chat image 30 displayed on the message display terminal 20 of the user A. As illustrated in FIG. 14, one message object 32N representing the same message as the message represented by the selected message object 32 and the message represented by the selected message object 32 may be displayed. The message object 32N may be accompanied by an identification image 42 indicating the users A and D having input the message. With this configuration, the message of the diversion source and a new message created by diverting the message of the diversion source are displayed as one message object 32, and hence the message object 32 becomes more visible.

It suffices that the display control unit 60 executes at least one of the two kinds of display control described in Modification Example (2). Further, the above description is directed to the case where the message transmission server 10 generates the message data as in the first embodiment, but the message display terminal 20 may be configured to generate the data also in Modification Example (2) as in the second or third embodiment. Also in this case, as described in the second or third embodiment, the message data is generated on the message display terminal 20, and the message objects 32 are displayed in association with one another or displayed as one message object 32.

(3) Further, for example, the above description is directed to the case of diverting the same message as the message represented by the selected message object 32, but the message does not need to be exactly the same message. The display control unit 60 may be configured to display the message object 32 representing a message obtained by changing the message represented by the selected message object 32.

FIG. 15 is a diagram for illustrating an example of the chat image 30. As illustrated in FIG. 15, when the user A drags and drops the message object 32D representing the message of the user D onto the avatar image 34C of the user C (in the state of a chat image 30E), the display control unit 60 displays a message object 32O representing a message obtained by inserting a character string indicating the user C represented by the avatar image 34C into the message of the diversion source (in the state of a chat image 30F).

The display control unit 60 displays the message object 32 (second message object) representing a message (second message) including: the message (first message) represented by the selected message object 32 (first message object); and the identification information for identifying the user represented by the selected avatar image 34. The above-mentioned identification information is a symbol string or image indicating the user's name.

In the example of FIG. 15, a character string for identifying the user C is inserted at the beginning of the message of the user D, but a place to insert the character string for identifying the user C may also be at the end of the message of the user D or in the middle of the message of the user D. In Modification Example (3), in the same manner as in the first embodiment, the data generation unit 70 of the message transmission server 10 generates the message data (that is, message data relating to the message obtained by changing the message represented by the selected message object 32), and the display control unit 60 receives the data through the transmission/reception units 58 and 64, to thereby display the message object 32.

According to Modification Example (3), it is possible to set the message represented by the message object 32 selected by the user as the user's own message by including the information for identifying the user in the message, and hence it is possible to clearly display to whom the message is addressed without time and labor.

The above description is directed to the case where the message transmission server 10 generates the message data as in the first embodiment, but the message display terminal 20 may be configured to generate the data also in Modification Example (3) as in the second or third embodiment. Also in this case, as described in the second or third embodiment, the message data is generated on the message display terminal 20, and the message object 32 representing the message obtained by inserting the information for identifying the user represented by the avatar image 34 selected by the user into the message of the diversion source is displayed.

(4) Further, for example, when the user's name or the like is included in the message of the diversion source, a new message may be set after replacing the name. The message according to this modification example is assumed to include the identification information for identifying at least one user among a plurality of users.

FIG. 16 is a diagram for illustrating an example of the chat image 30. As illustrated in FIG. 16, when the user A drags and drops a message object 32P representing the message of the user D onto the avatar image 34C of the user C (in the state of a chat image 30G), the display control unit 60 displays a message object 32Q representing a message obtained by replacing identification information of the user within the message (in this case, "I" representing the user D) by identification information of the user C represented by the avatar image 34C (in the state of a chat image 30H). It suffices that the method of determining whether or not the identification information is included in the message is conducted by determining whether or not a predetermined symbol string or image is included.

As described above, the display control unit 60 displays the message object 32Q (second message object) representing a message (second message) obtained by replacing the identification information included in the message (first message) represented by the selected message object 32P (first message object) by the information for identifying the user represented by the selected avatar image 34C. In Modification Example (4), in the same manner as in the first embodiment, the data generation unit 70 of the message transmission server 10 generates the message data, and the display control unit 60 receives the data through the transmission/reception units 58 and 64, to thereby display the message object 32.

According to Modification Example (4), each user can set the message as his or her own message after replacing the identification information within the message, and hence it is possible to alleviate time and labor to change to whom the message is addressed.

The above description is directed to the case where the message transmission server 10 generates the message data as in the first embodiment, but the message display terminal 20 may be configured to generate the data also in Modification Example (4) as in the second or third embodiment. Also in this case, as described in the second or third embodiment, the message data is generated on the message display terminal 20, and the message object 32 representing the message obtained by replacing the identification information in the message of the diversion source by the information for identifying the user represented by the avatar image 34 selected by the user.

(5) Further, for example, a plurality of message candidates defined in advance are stored in the data storage unit 50, and a transmission operation for transmitting at least one of those message candidates as a message may be conducted. In this case, the selection operation for the message object 32 is different from the above-mentioned transmission operation. The message candidates are merely a text or the like defined in advance, and are therefore not sometimes contents assumed based on the current situation of a game (contents that suit the current situation). However, the message object 32 represents the message input during the execution of the game, and indicates a content that suits the current situation. Therefore, by diverting the message object 32, it is possible to transmit the message that suits the situation at that time compared with the case where the message candidate is selected.

(6) Further, for example, the above description is directed to the case where the message object 32 is displayed so as to be drawn from the avatar image 34 in the display mode that enables the inputter to be identified, but the message object 32 does not need to be displayed in the display mode that enables the inputter to be identified. That is, the display control unit 60 may simply display the message object 32 representing the same message as the message of the diversion source or the message object 32 representing the message determined based on the message of the divers ion source without particularly enabling the inputter to be identified. Also in this case, by diverting a message, it is possible to alleviate the time and labor to input the message.

Further, for example, the embodiments and the above-mentioned modification examples may be combined.

Further, for example, among the respective functional blocks, the functional blocks other than the selection operation reception unit 56 and the display control unit 60 may be omitted from the message display terminal 20, and the functional blocks other than the transmission/reception unit 64 may be omitted from the message transmission server 10.

Further, for example, the message transmission server 10 may generate image data on the entire chat image 30 including the message objects 32 (for example, data having an HTML format), and distribute the image data to the respective message display terminals 20. In this case, the message data may include the image data on the entire chat image 30.

Further, for example, the message control system 1 may include only the message display terminal 20 without the message transmission server 10. Even in this case, anyone of the message display terminals 20 may be configured to serve as a server.

Further, for example, the message transmission server or a message control terminal according to the present invention only need to be applied to a technology for exchanging messages among users, and can also be applied to a technology other than the chat. For example, the present invention can also be applied to an electronic bulletin board configured to allow a plurality of users to post a message.

5. Supplemental

The present invention is grasped, for example, as follows based on the above descriptions. A message display terminal (20) according to one embodiment of the present invention relates to a message display terminal (20) comprising at least one processor configured to: display a message object representing a message input by each of a plurality of users in a display mode that enables a user having input the message to be identified; receive a selection operation for selecting the message object; obtain message data, which is generated in response to the selection operation, relating to a second message which is determined based on a first message represented by a first message object which is the selected message object; and display a second message object representing the second message in a display mode that enables a user having conducted the selection operation to be identified as a user having input the second message based on the obtained message data.

Further, a message display terminal (20) according to one embodiment of the present invention relates to a message display terminal (20) comprising at least one processor configured to: display a message object representing a message input by each of a plurality of users; receive a selection operation for selecting the message object; obtain message data, which is generated in response to the selection operation, relating to a second message which is determined based on a first message represented by a first message object which is the selected message object; and display a second message object representing the second message based on the obtained message data.

Further, a message transmission server (10) according to one embodiment of the present invention relates to a message transmission server (10) comprising at least one processor configured to: transmit message data relating to a message input by each of a plurality of users to a terminal of each user; receive, from the terminal of the each user, a message selection notification indicating that a message object representing the message has been selected; generate message data, in response to the received message selection notification, relating to a second message which is determined based on a first message represented by a first message object which is the selected message object; set a user of a transmission source of the message selection notification as a user having input the second message; and transmit the generated message data to the terminal of the each user.

Further, a program according to one embodiment of the present invention causes a computer to: display a message object representing a message input by each of a plurality of users in a display mode that enables a user having input the message to be identified; receive a selection operation for selecting the message object; obtain message data, which is generated in response to the selection operation, relating to a second message which is determined based on a first message represented by a first message object which is the selected message object; and display a second message object representing the second message in a display mode that enables a user having conducted the selection operation to be identified as a user having input the second message based on the obtained message data.

Further, an information storage medium according to one embodiment of the present invention is a computer-readable information storage medium having the above-mentioned program recorded thereon.

Further, according to one mode of the present invention, the at least one processor receiving the selection operation for selecting a message object displayed based on history information relating to the message objects that have been displayed.

Further, according to one mode of the present invention, the at least one processor receiving the selection operation for selecting a message object displayed based on the history information on the selected user.

Further, according to one mode of the present invention, the at least one processor displaying the message objects based on the history information so as to avoid redundancy between the same messages.

Further, according to one mode of the present invention, the at least one processor: displaying the second message object representing the second message determined based on the first message represented by the first message object and the first message object in association with each other; and/or displaying one second message object representing the second message determined based on the first message represented by the first message object and the first message represented by the first message object.

Further, according to one mode of the present invention, the at least one processor: receiving an operation for selecting at least one of a plurality of user objects representing the respective plurality of users; and displaying the second message object representing the second message including the first message represented by the first message object and identification information for identifying the user represented by the selected at least one of user objects.

Further, according to one mode of the present invention, the message represented by the message object including identification information for identifying at least one user among the plurality of users; and the at least one processor: receiving an operation for selecting at least one of a plurality of user objects representing the respective plurality of users; and displaying the second message object representing the second message obtained by replacing the identification information included in the first message represented by the first message object by information for identifying the user represented by the selected at least one of user objects.

Further, according to one mode of the present invention, the at least one processor: receiving a transmission operation for transmitting the input message or a transmission operation for transmitting at least one of a plurality of message candidates defined in advance as the message; and receiving the selection operation different from the transmission operation.

What is claimed is:

1. A message display terminal comprising at least one processor configured to:
    display message objects representing messages input by each of three or more users in a display mode that enables a user having input a message to be identified;
    receive a first selection operation for selecting a specific message object representing a first message;
    receive a second selection operation for selecting at least one of three or more user objects representing the respective three or more users; and
    display a second message object representing a second message when the first section operation and the second selection operation are received, the second message being formed by adding a username of the user selected by the second selection operation to a content of the first message while the content of the first message is maintained, wherein the second message object is displayed in a display mode that enables a user having conducted the first selection operation and the second selection operation to be identified as a user having input the second message.

2. The message display terminal according to claim 1, the at least one processor receiving the selection operation for selecting the message object displayed based on history information relating to message objects that have been displayed.

3. The message display terminal according to claim 2, the at least one processor receiving the selection operation for selecting the message object displayed based on the history information about a selected user.

4. The message display terminal according to claim 2, the at least one processor displaying the message objects based on the history information so as to avoid redundancy between the same messages.

5. The message display terminal according to claim 1, the at least one processor:

displaying the second message object representing the second message determined based on the first message represented by the first message object and the first message object in association with each other; and/or displaying one second message object representing the second message determined based on the first message represented by the first message object and the first message represented by the first message object.

6. The message display terminal according to claim 1, wherein a number of users is four.

7. A message display terminal comprising at least one processor configured to:

display message objects representing messages input by each of three or more users in a display mode that enables a user having input a message to be identified;

receive a first selection operation for selecting a specific message object representing a first message that includes a first username;

receive a second selection operation for selecting at least one of three or more user objects representing the respective three or more users; and display a second message object representing a second message that the first username is replaced to a second username of the user selected by the second selection operation, when the first selection operation and the second selection operation are received;

wherein the second message object is displayed in a display mode that enables a user having conducted the first selection operation and the second selection operation to be identified as a user having input the second message, and in the display mode a username of the user who has conducted the first selection operation and the second selection operation and input the second message is also identified.

8. The message display terminal according to claim 1, the at least one processor:

receiving a transmission operation for transmitting the input message or a transmission operation for transmitting at least one of a plurality of message candidates defined in advance as the message; and receiving the first selection operation and the second selection operation that are different from the transmission operation.

9. A message display terminal comprising at least one processor configured to:

display message objects representing messages input by each of three or more users;

receive a first selection operation for selecting a specific message object representing a first message;

receive a second selection operation for selecting at least one of three or more user objects representing the respective three or more users; and display a second message object representing a second message when the first section operation and the second selection operation are received, the second message being formed by adding a username of the user selected by the second selection operation to a content of the first message while the content of the first message is maintained.

10. A message transmission server comprising at least one processor configured to:

transmit message data relating to a message input by each of three or more users to a terminal of each user;

receive, from the terminal of the each user, a message selection notification indicating that a specific message object representing a first message has been selected;

receive, from the terminal of the each user, a user selection notification indicating that at least one of three or more user objects representing the respective three or more users has been selected; and generate message data relating to a second message that a user name of the user indicated by the user selection notification is added to the first message, when the message selection notification and the user selection notification are received;

wherein the second message object is displayed in a display mode that enables a user of a transmission source of the message selection notification and the user selection notification to be identified as a user having input the second message, and in the display mode a username of the user who has selected the first message and the user selection and input the second message is also identified.

11. A non-transitory computer-readable information storage medium having recorded thereon a program for causing a computer to:

display message objects representing messages input by each of three or more users in a display mode that enables a user having input the message to be identified;

receive a first selection operation for selecting a specific message object representing a first message;

receive a second selection operation for selecting at least one of three or more user objects representing the respective three or more users; and display a second message object representing a second message that a username of the user selected by the second selection operation is added to the first message without changing the first message, when the first selection operation and the second selection operation are received;

wherein the second message object is displayed in a display mode that enables a user having conducted the first selection operation and the second selection operation to be identified as a user having input the second message, and in the display mode a username of the user who has conducted the first selection operation and the second selection operation and input the second message is also identified.

12. A message display terminal comprising at least one processor configured to:
    display message objects representing messages input by each of three or more users;
    receive a first selection operation for selecting a specific message object representing a first message that includes a first username;
    receive a second selection operation for selecting at least one of three or more user objects representing the respective three or more users; and
    display a second message object representing a second message that the first username is replaced to a second username of the user selected by the second selection operation, when the first selection operation and the second selection operation are received;
    wherein the second message object is displayed in a display mode that enables a user having conducted the first selection operation and the second selection operation to be identified as a user having input the second message, and in the display mode a username of the user who has conducted the first selection operation and the second selection operation and input the second message is also identified.

13. A message transmission server comprising at least one processor configured to:
    transmit message data relating to a message input by each of three or more users to a terminal of each user;
    receive, from the terminal of the each user, a message selection notification indicating that a specific message object representing a first message that includes a first username has been selected;
    receive, from the terminal of the each user, a user selection notification indicating that at least one of three or more user objects representing the respective three or more users has been selected; and
    generate message data relating to a second message that the first username is replaced to a second username indicated by the user selection notification, when the message selection notification and the user selection notification are received;
    wherein the second message object is displayed in a display mode that enables a user of a transmission source of the message selection notification and the user selection notification to be identified as a user having input the second message, and in the display mode a username of the user who has selected the first message and the user selection and input the second message is also identified.

14. A non-transitory computer-readable information storage medium having recorded thereon a program for causing a computer to:
    display message objects representing messages input by each of three or more users in a display mode that enables a user having input a message to be identified;
    receive a first selection operation for selecting a specific message object representing a first message that includes a first username;
    receive a second selection operation for selecting at least one of three or more user objects representing the respective three or more users; and
    display a second message object representing a second message that the first username is replaced to a second username of the user selected by the second selection operation, when the first selection operation and the second selection operation are received;
    wherein the second message object is displayed in a display mode that enables a user having conducted the first selection operation and the second selection operation to be identified as a user having input the second message, and in the display mode a username of the user who has conducted the first selection operation and the second selection operation and input the second message is also identified.

* * * * *